(12) United States Patent
Migutin et al.

(10) Patent No.: US 12,188,311 B2
(45) Date of Patent: Jan. 7, 2025

(54) CONTROL ATTACHMENT FOR A TONG ASSEMBLY POSITIONING SYSTEM

(71) Applicant: Weatherford Technology Holdings, LLC, Houston, TX (US)

(72) Inventors: Alexander Migutin, Langenhagen (DE); Karsten Heidecke, Houston, TX (US); Martin Helms, Burgdorf (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 494 days.

(21) Appl. No.: 17/192,689

(22) Filed: Mar. 4, 2021

(65) Prior Publication Data
US 2022/0282583 A1 Sep. 8, 2022

(51) Int. Cl.
*E21B 19/16* (2006.01)
*F15B 15/20* (2006.01)

(52) U.S. Cl.
CPC .......... *E21B 19/165* (2013.01); *E21B 19/163* (2013.01); *F15B 15/20* (2013.01)

(58) Field of Classification Search
CPC .... E21B 19/161; E21B 19/163; E21B 19/165; F15B 15/20
See application file for complete search history.

(56) References Cited

U.S. PATENT DOCUMENTS

| | | | |
|---|---|---|---|
| 3,874,518 A | * 4/1975 | Swoboda, Jr. | .......... E21B 19/14 414/733 |
| 9,766,364 B2 | 9/2017 | Hickman | |
| 2004/0216906 A1 | * 11/2004 | Rogers | .................. E21B 19/165 173/216 |
| 2007/0079671 A1 | * 4/2007 | Halse | .................... E21B 19/164 81/57.35 |
| 2009/0065189 A1 | * 3/2009 | Hobgood | .............. E21B 19/165 166/85.5 |
| 2010/0199812 A1 | 8/2010 | Richardson | |
| 2016/0123094 A1 | * 5/2016 | Amezaga | .............. E21B 19/165 166/380 |

(Continued)

FOREIGN PATENT DOCUMENTS

| | | |
|---|---|---|
| EP | 2612982 A2 | 7/2013 |
| WO | 2008034262 A1 | 3/2008 |

OTHER PUBLICATIONS

International Search Report and Written Opinion PCT/US20201/072799 dated Mar. 17, 2022.

*Primary Examiner* — Christopher J Sebesta
(74) *Attorney, Agent, or Firm* — Smith IP Services, P.C.

(57) ABSTRACT

A tong positioning system includes a positioning device configured to move a tong assembly. The positioning device includes a first actuator, a second actuator, and a control attachment attachable to the positioning device. The control attachment includes a shutoff valve fluidly coupled to a hydraulic supply, a control valve block, and a control device. The control valve block includes a hydraulic input fluidly coupled to the shutoff valve, a hydraulic output fluidly coupled to a hydraulic return, a first valve fluidly coupled to the first actuator, the first valve configured to actuate the first actuator, and a second valve fluidly coupled to the second actuator, the second valve configured to actuate the second actuator. The control device is configured to control the first valve and to control the second valve to actuate the first and second actuators to move the tong assembly.

11 Claims, 13 Drawing Sheets

(56) References Cited

U.S. PATENT DOCUMENTS

2019/0048671 A1    2/2019  Wern et al.
2019/0211851 A1*  7/2019  Behera .................... F15B 11/10
2021/0102454 A1*  4/2021  Jorud ................... G06Q 50/265

* cited by examiner

CONTROL ATTACHMENT FOR A TONG ASSEMBLY POSITIONING SYSTEM

BACKGROUND

Field

Embodiments of the present disclosure generally relate to a control attachment for a tong positioning device.

Description of the Related Art

Tong assemblies are used for making up or breaking out threaded connections of tubulars. Tong assemblies are heavy and expensive. Positioning devices are used to move the tong assemblies about a worksite, and the positioning device may support a tong assembly during a makeup or breakout operation. Positioning devices are themselves heavy and expensive pieces of oilfield equipment. Tong assemblies and positioning devices are often both hydraulically actuated, requiring a complex hydraulic control system to operate the positioning device to actuate the positioning device to move the tong assembly and to supply hydraulic fluid to the tong assembly.

Tong assembly technology is constantly improving, resulting in, for example, new power tongs that have a higher success rate of satisfactorily making up a threaded connection. While an oilfield operator may purchase or rent a new tong assembly, the operator may not be inclined to purchase a new positioning device. Therefore, there exists a need for a control attachment that can be attached to a positioning device, such as preexisting positioning devices with older technology, which is capable of controlling the new tong assemblies while also being capable of controlling the positioning device. As a result, an oilfield operator may use the same positioning device with a new tong assembly.

SUMMARY

In one embodiment, a tong positioning system includes a positioning device configured to move a tong assembly. The positioning device includes a first actuator, a second actuator, and a control attachment attachable to the positioning device. The control attachment includes a shutoff valve fluidly coupled to a hydraulic supply, a control valve block, and a control device. The control valve block includes a hydraulic input fluidly coupled to the shutoff valve, a hydraulic output fluidly coupled to a hydraulic return, a first valve fluidly coupled to the first actuator, the first valve configured to actuate the first actuator, and a second valve fluidly coupled to the second actuator, the second valve configured to actuate the second actuator. The control device is configured to control the first valve and to control the second valve to actuate the first and second actuators to move the tong assembly.

In one embodiment, a tong positioning system includes a tong assembly, an adapter, a positioning device, and a control attachment. The adapter is configured to support the tong assembly, the adapter including a first actuator actuatable to raise or lower the tong assembly. The positioning device is configured to move the adapter and the tong assembly, the positioning device including a second actuator. The control attachment is attachable to the adapter. The control attachment including a control valve assembly, a compensation valve block, and a control device. The control valve assembly is fluidly coupled to a hydraulic supply. The control valve assembly including a hydraulic input, a first valve, and a hydraulic output. The compensation valve block fluidly is coupled to the control valve assembly and fluidly coupled to the first actuator. The control device is configured to actuate the first valve and the compensation valve block to actuate the first actuator, the control device further configured to activate the compensation valve block to actuate the compensation valve block to compensate for a thread makeup and/or a thread breakout operation with the tong assembly.

In one embodiment of a method of operating a tong apparatus at a worksite, the method including installing a control attachment to a positioning device, the control attachment including a control valve assembly and a compensation valve block. The method further including actuating the control valve assembly to hydraulically actuate a first actuator of the positioning device to move the tong apparatus coupled to the positioning device to a position about an x, y axes at the worksite. The method further including actuating the control valve assembly and the compensation valve block to hydraulically actuate a second actuator to raise or lower the tong apparatus about a z-axis at the worksite. The method further including activating the compensation valve block to actuate the second actuator to compensate for a thread makeup or thread breakout operation of the tong apparatus.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 2A illustrates a perspective view of the control attachment. FIG. 2B illustrates a different perspective view of the control attachment shown in FIG. 2A. FIG. 2C illustrates a partial perspective view of the control attachment omitting certain features to more clearly show other aspects of the control attachment. FIG. 2D illustrates a partial perspective view of the control attachment omitting certain features to more clearly show other aspects of the control attachment.

FIG. 4A illustrates a perspective view of the control attachment. FIG. 4B illustrates a different perspective view of the control attachment as shown in FIG. 4A. FIG. 4C illustrates a partial perspective view of the control attachment shown in FIG. 4B omitting certain features to more clearly show other aspects of the control attachment. FIG. 4D illustrates a different perspective view of the control attachment as shown in FIG. 4A.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
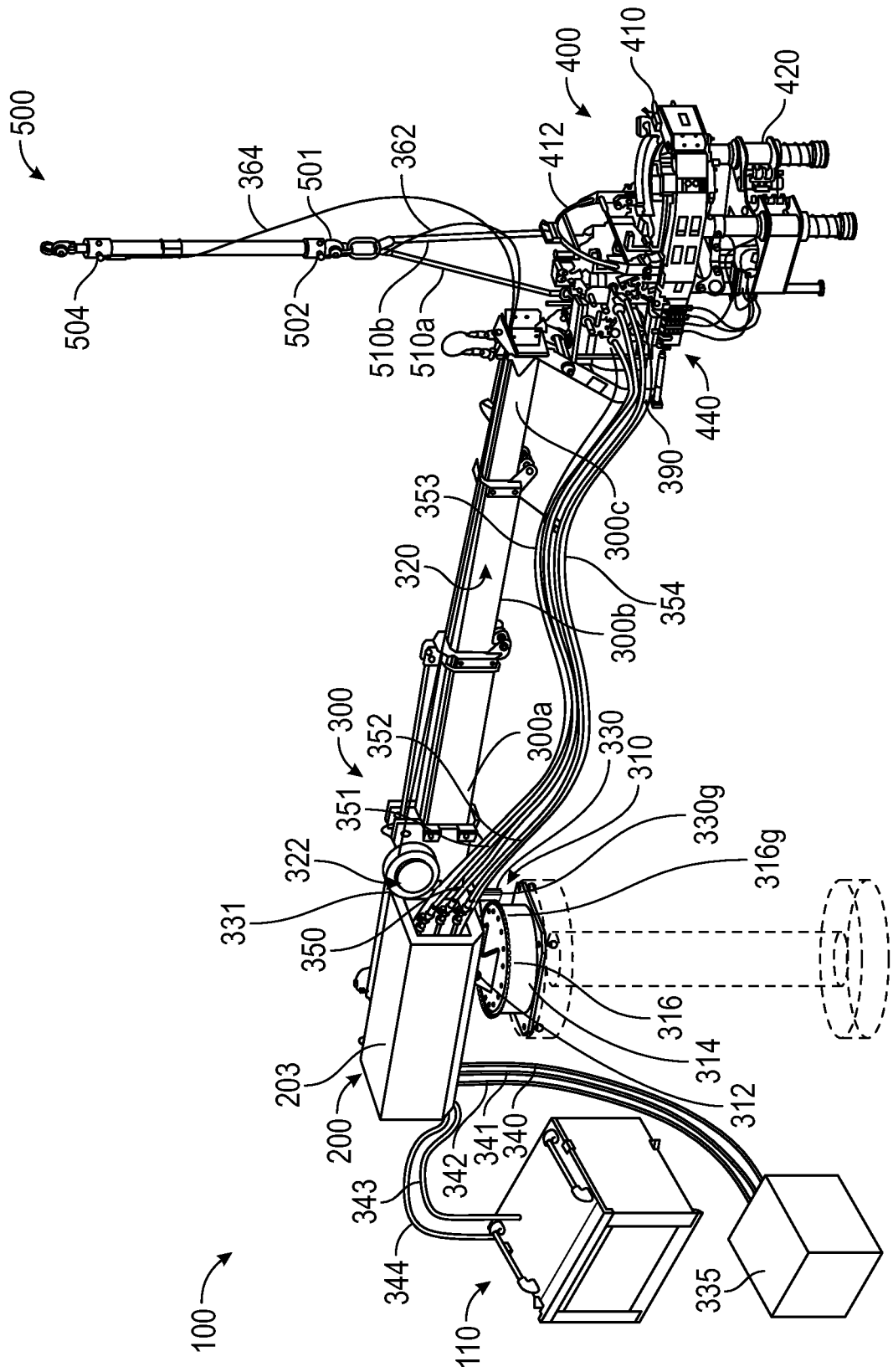
FIG. 1 illustrates one embodiment of a tong positioning system.

FIG. 1 illustrates an exemplary tong positioning system 100. The tong positioning system 100 includes a control system 110, a control attachment 200, a positioning device 300, a tong assembly 400, and a vertical actuator 500. The positioning device 300 and vertical actuator 500 may move the tong assembly 400 around a worksite in response to commands from the control system 110. The control attachment 200 is attached to the positioning device 300. The control attachment 200 may be in communication with one or more of the control system 110, the positioning device 300, the tong assembly 400, and the vertical actuator 500. The control system 110 may instruct the control attachment 200 to control the operation of the positioning device 300 and/or the tong assembly 400.

In FIG. 1, the positioning device 300 includes a base 310 and an arm 320. The tong assembly 300 may also include a line reel 322. The base 310 includes a stationary portion 314 and a rotatable portion 316. The rotatable portion 316 is rotatable relative to the stationary portion 314 by a hydraulic rotational actuator 330. The hydraulic rotational actuator 330, as shown in FIG. 1, includes a gear 330g configured to mesh with a gear 316g of the rotatable portion 316. The arm 320 is coupled to the rotatable portion 316, and the arm 320 is pivotable relative to the base 310 about a pivot point 312. The arm 320 may be an extendable arm with telescoping segments 320a,b,c, thereby allowing the arm 320 to extend and retract. The arm 320 includes a hydraulic arm actuator 331 configured to extend and retract the arm 320. As shown, the hydraulic arm actuator 331 is a hydraulic actuator, such as a hydraulic cylinder. The positioning device 300 is configured to move the tong assembly 400 along the x-axis and y-axis of the worksite floor. The tong assembly 400 is selectively attachable to one end of the arm 320. As shown in FIG. 1, the tong assembly 400 is attached to one end of the arm 320 via a tong adapter 390. The tong adapter 390 is coupled to one end of the arm 320.

FIG. 1 illustrates an exemplary embodiment of the vertical actuator 500. The vertical actuator 500 is actuatable to raise or lower the tong assembly 400. The vertical actuator 500 is disposed above the worksite floor and attached to the tong assembly 400 at one end. The other end of the vertical actuator 500 may be coupled to a crane system of a derrick. In some embodiments, and as shown in FIG. 1, the vertical actuator 500 is coupled to the tong assembly 400 by links 510a,b. The vertical actuator 500 is configured to move the tong assembly 400 along the z-axis (e.g., raise or lower the tong assembly 400). To raise the tong assembly 400, the vertical actuator 500 may be retracted. To lower the tong assembly 400, the vertical actuator 500 may be extended. Raising or lowering the tong assembly 400 causes the arm 320 to pivot relative to the base 310.

As shown in FIG. 1, the vertical actuator 500 is a hydraulic cylinder including a hydraulically actuated piston 501 configured to be extended or retracted in response to hydraulic fluid. In some embodiments, and as shown in FIG. 1, the vertical actuator 500 is positioned such that the links 510a,b are coupled to one end of the piston 501. The vertical actuator 500 includes a first port 502 and a second port 504. The first port 502 is in communication with a lower chamber of the vertical actuator 500 bounded at one end by the piston 501 and the second port 504 is in communication with an upper chamber bounded at one end by the piston 501. In some embodiments, the piston 501 is retracted to retract the vertical actuator 500. For example, hydraulic fluid is supplied to the first port 502 to retract the piston 501, and the second port 504 allows return fluid to flow from the vertical actuator 500. In some embodiments, the piston 501 is extended to extend the vertical actuator 500. For example, hydraulic fluid may be supplied to the second port 504 to extend the piston 501, and the first port 502 allows return fluid to flow from the vertical actuator 500.

The tong assembly 400 may include a power tong 410 and a backup tong 420. The tong assembly 400 is used to conduct to makeup or break-out a threaded connection between two tubulars. For example, during a makeup operation, the backup tong 420 clamps a first tubular and the power tong 410 rotates a second tubular relative to the first tubular to makeup a threaded connection of the tubulars. The power tong 410 and/or the backup tong 420 may be hydraulically actuated. For example, the power tong 410 may include a hydraulic motor configured to rotate jaws that grip a tubular. This hydraulic motor is actuated by hydraulic fluid. During a tubular makeup operation, the power tong 410 may move closer to the backup tong 420 due to the makeup of the threads. During a tubular break-out operation, the power tong 410 may move away from the backup tong 420 due to the unthreading of the two tubulars. As shown in FIG. 1, the power tong 410 is coupled to the vertical actuator 500 by link 510b, which is connected at one end to a hanger 412 connected to the power tong 410. To compensate for the travel of the power tong 410 relative to the backup tong 420 during a makeup operation, the vertical actuator 500 extends in response to hydraulic fluid. To compensate for the travel of the power tong 410 relative to the backup tong 420 during a breakout operation, the vertical actuator 500 retracts in response to hydraulic fluid.

Figure 2A:
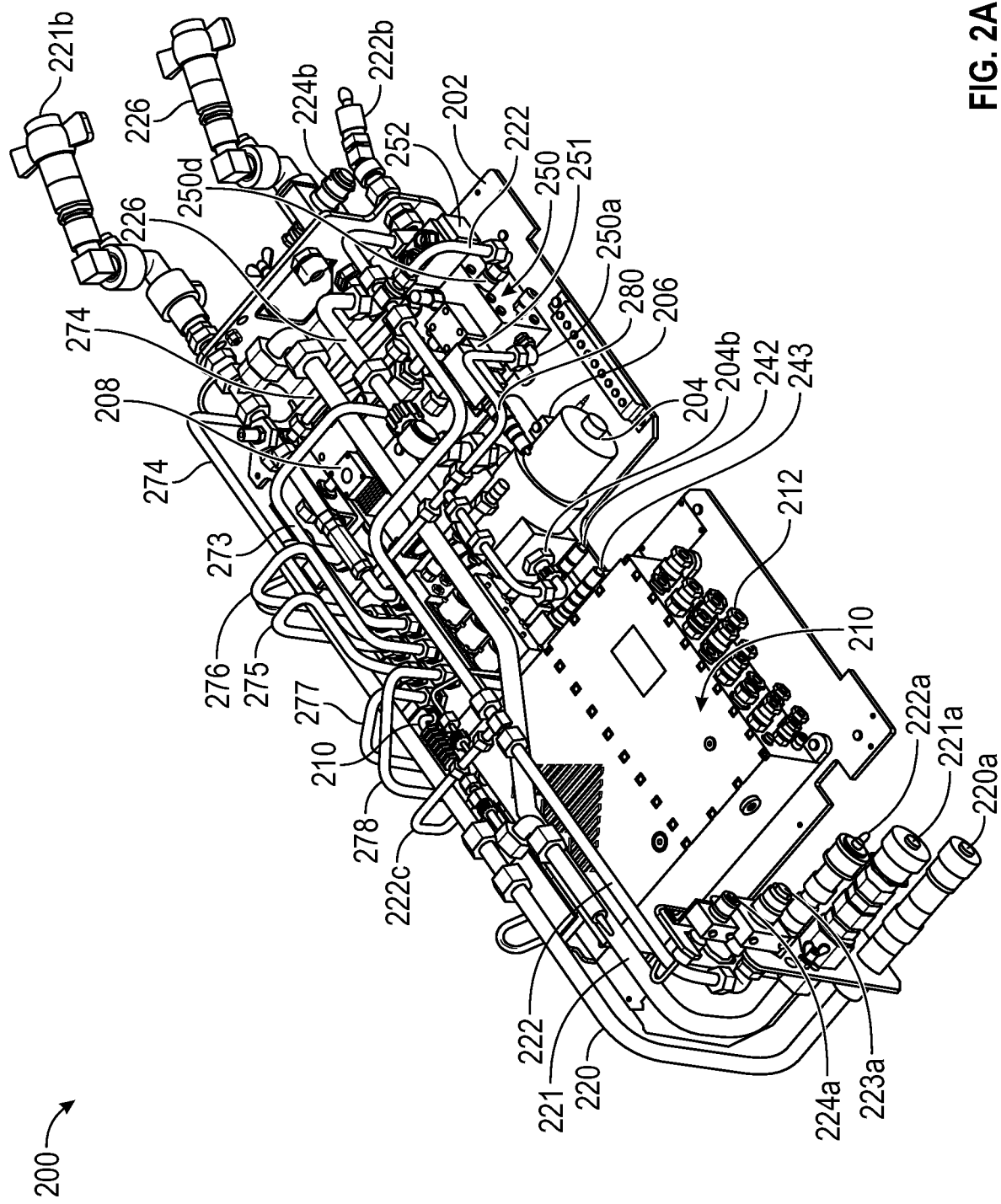
FIGS. 2A-2D illustrate one embodiment of a control attachment.
Figure 2B:
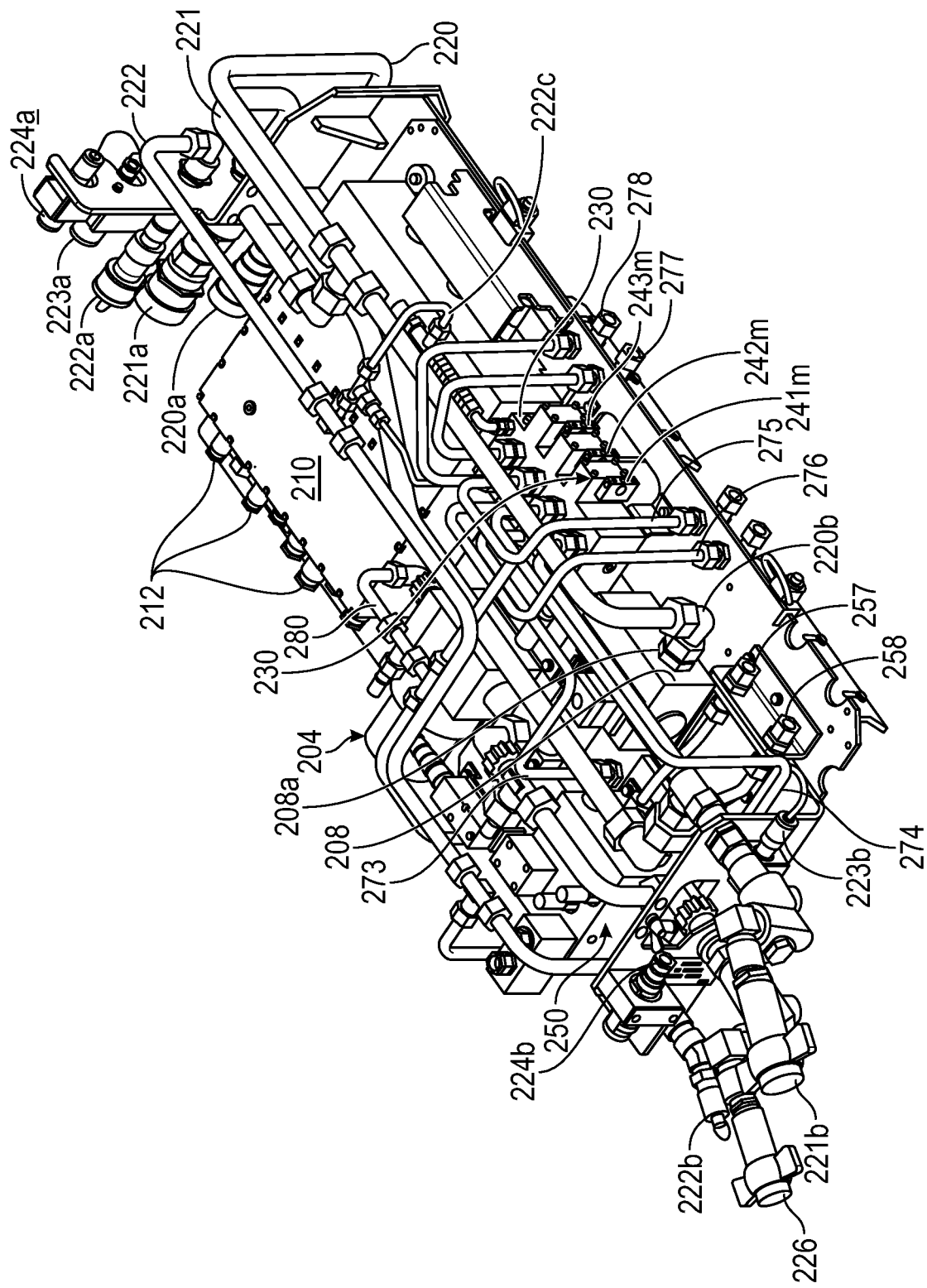
Figure 2C:
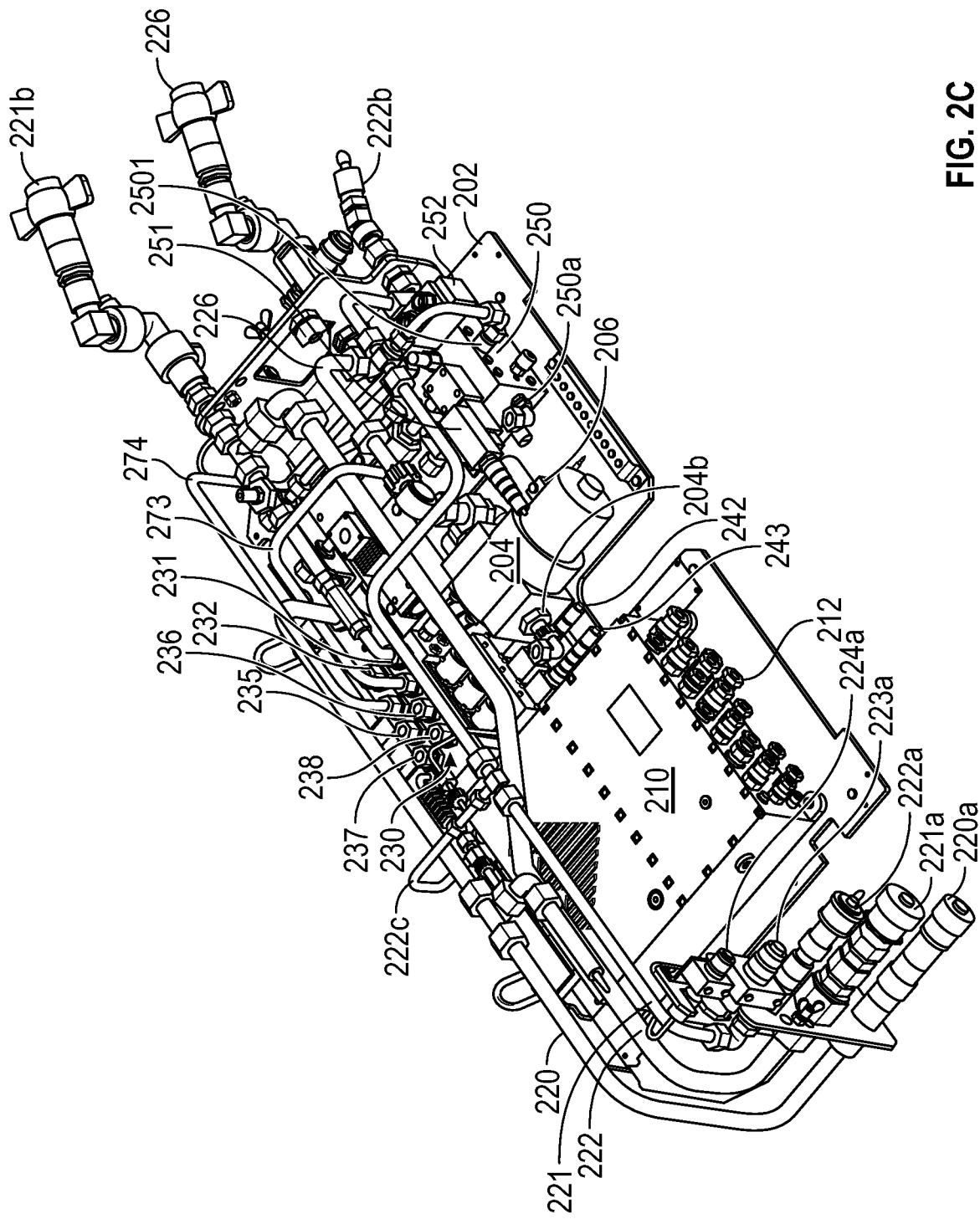
Figure 2D:
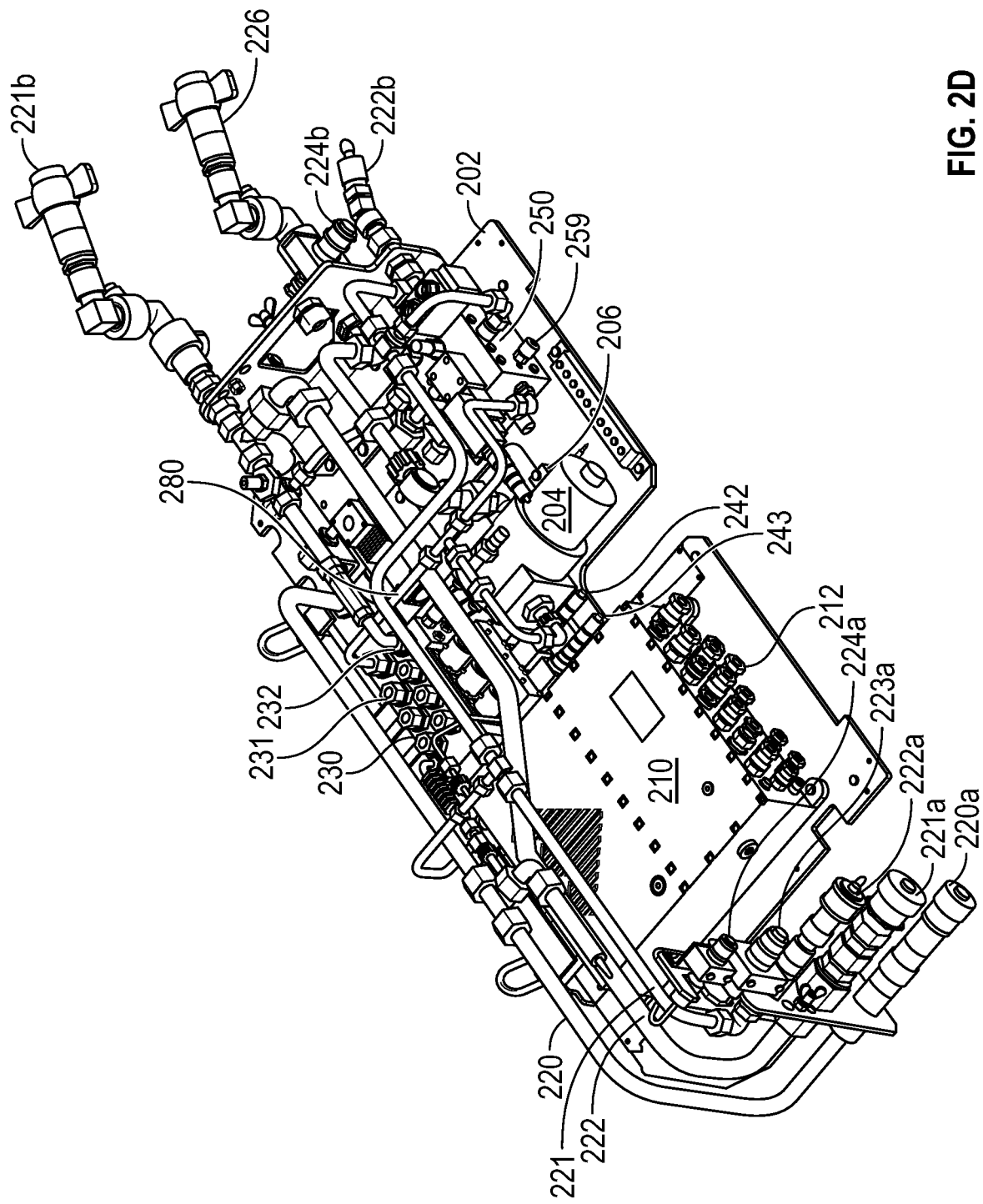
Figure 2E:
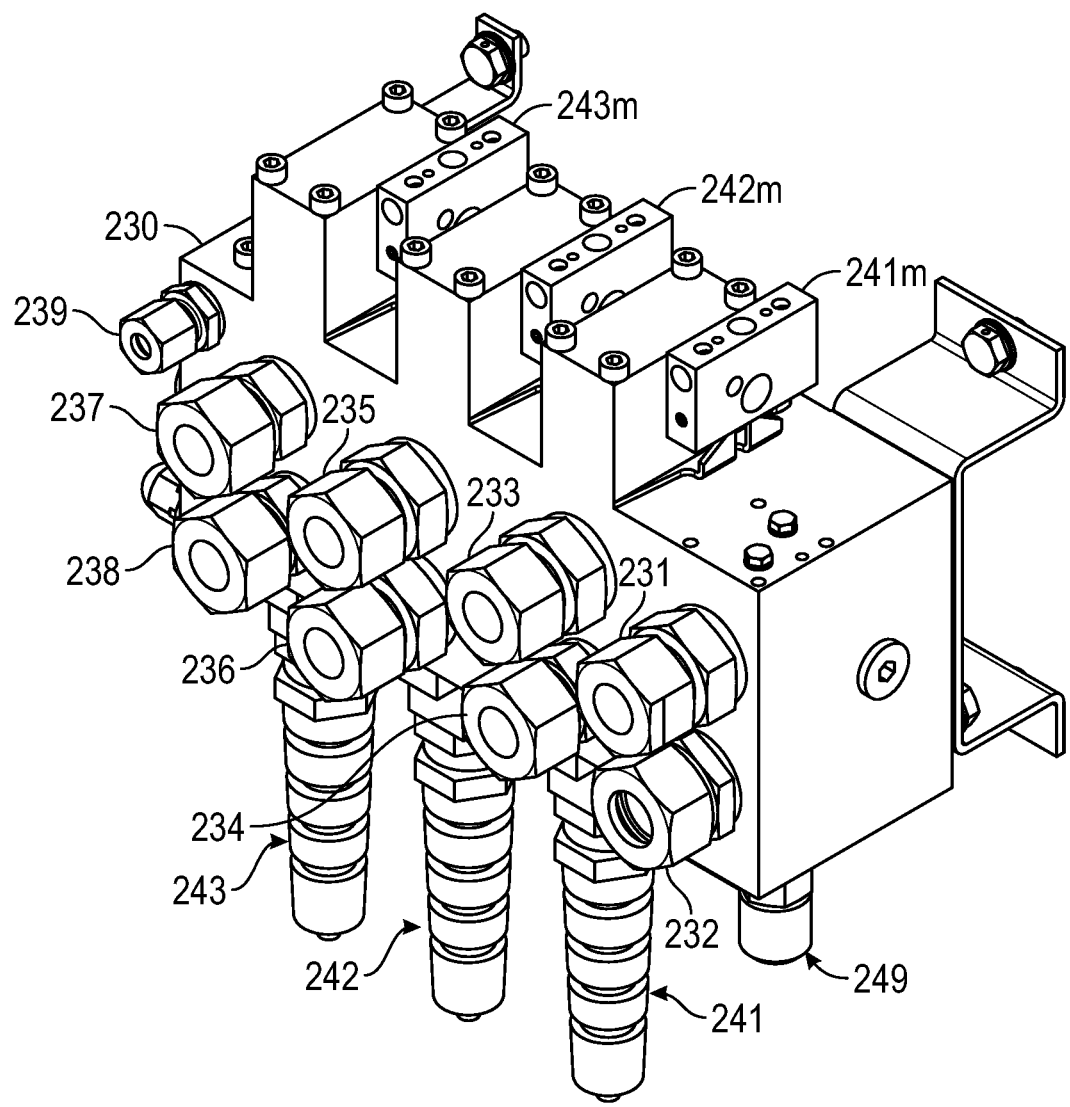
FIG. 2E illustrates a control valve assembly of the control attachment.
Figure 2F:
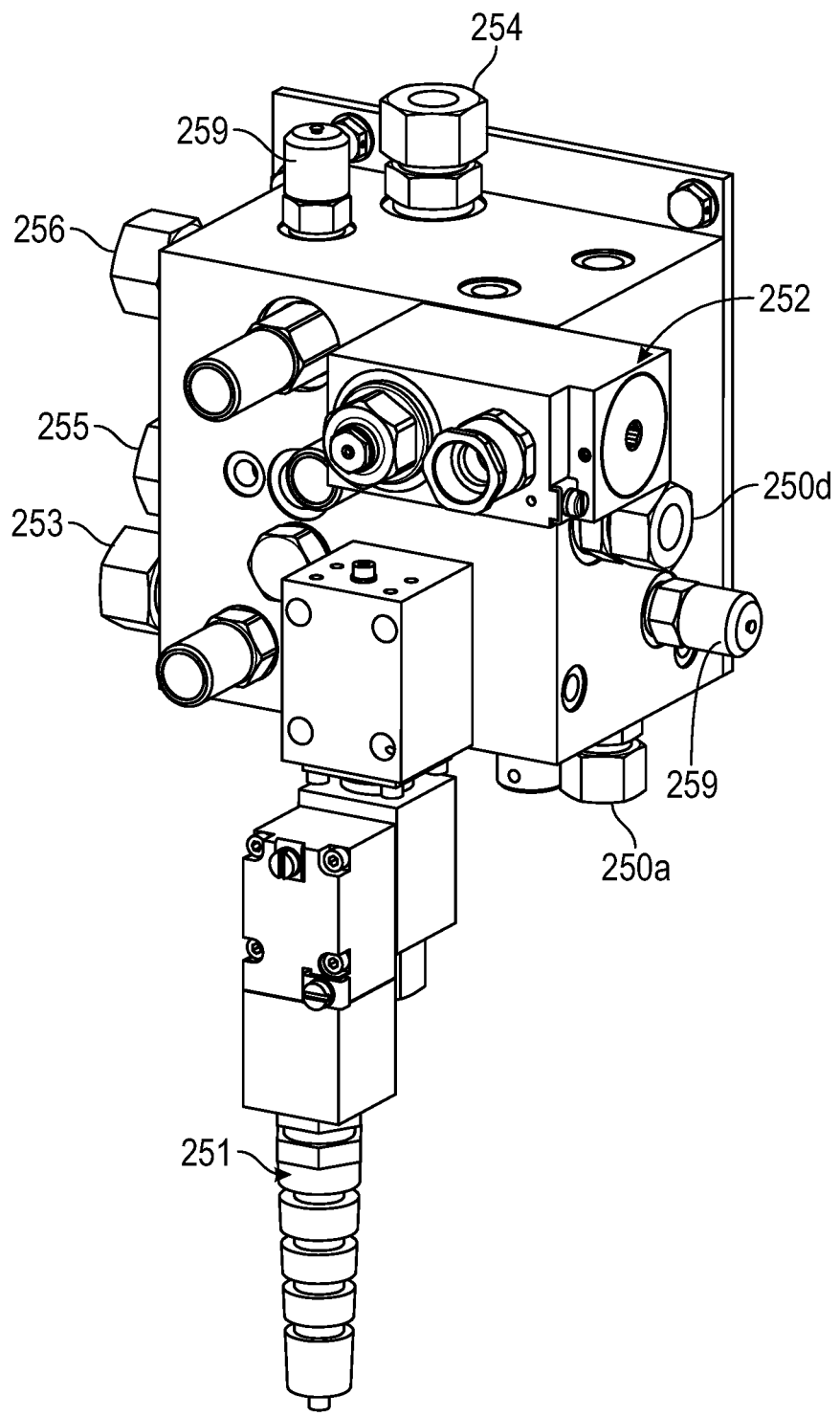
FIG. 2F illustrates a compensation valve block of the control attachment.

FIG. 2A-2D illustrates an exemplary embodiment of the control attachment 200. FIG. 1 shows the control attachment 200 attached to the positioning device 300. The FIG. 2C-2D illustrates the control attachment 200 but omits certain hydraulic lines to better show the features of the control attachment 200. FIG. 2E illustrates a control valve assembly 230 of the control attachment. FIG. 2F illustrates a compensation valve block 250 of the control attachment 200.

As shown in FIG. 2A, the control attachment 200 includes a body 202, a filter 204, a pressure sensor (or pressure transducer) 206, a shutoff valve 208, a control device 210, the control valve assembly 230, an attachment hydraulic supply line 220, an attachment hydraulic return line 221, an attachment hydraulic drain line 222, the compensation valve block 250, and hydraulic control lines 273-278. The control attachment 200 may further include an attachment electrical supply line 223 and an attachment Ethernet line 224. FIG. 2B illustrates a different perspective view of the control attachment 200 shown in FIG. 2A. As shown in FIG. 1, the control attachment 200 may include a cover 203 that is connectable to the body 202.

The shutoff valve 208, the control valve assembly 230, the control device 210, and the compensation valve block 250 may be attached to the body 202 by conventional means, such as one or more fasteners or welds. The control device 210 may similar to the tool mounted controller disclosed in U.S. patent Ser. No. 10/480,291, which is hereby incorporated by reference. The control device 210 may be in communication with the control system 110, the pressure sensor 206, the shutoff valve 208, the control valve assembly 230, and the compensation valve block 250. One or more communication cables (not shown) may connect the pressure sensor 206, the shutoff valve 208, the control valve assembly 230, and the compensation valve block 250 to the control device 210. For example, the one or more communication cables may connected to one or more connectors 212 of the control device 210. In some embodiments, the control device 210 is in wireless communication with the control system 110, the pressure sensor 206, the shutoff valve 208, the control valve assembly 230, and/or compensation valve block 250. The control system 110 may send commands to the control device 210 to control the shutoff valve 208, the control valve assembly 230, and the compensation valve block 250. The control device 210 may include one or more internal electronic components, such as an internal processor programed to execute commands. The connectors 212 may be in communication with one or more internal components of the control device 210, such as an internal computer or processor.

The control device 210 may be in communication with the attachment Ethernet line 224. The control device 210 may receive electrical power from the attachment electrical line 223. In some embodiments, the attachment electrical line 223 may be connected to a first connector 212 and the attachment Ethernet line 224 may be connected to a second connector 212.

The shutoff valve 208 includes an inlet 208a and an outlet 208b. The shutoff valve 208 is actuatable to selectively open or close fluid flow between the inlet 208a and the outlet 208b. For example, the control device 210 may command the shutoff valve 208 to selectively open or close fluid flow between the inlet 208a and the outlet 208b. The filter 204 includes in inlet 204a and an outlet 204b and a filter member (not shown) disposed in the filter 204. The inlet 204a is fluidly coupled to the outlet 208b by a line 226.

FIG. 2E illustrates the control valve assembly 230. The control valve assembly 230 may be a valve block manufactured by HAWE Hydraulik. The control valve assembly 230 includes a hydraulic input 231, a hydraulic output 232, fluid couplings 233-238, and a hydraulic drain 239. The control valve assembly further includes valves 241-243. The valves 241-243 may be solenoid valves, such as bidirectional solenoid valves. In some embodiments, the control valve assembly 230 includes one or more measuring point couplings 249, which can be optionally connected to a pressure sensor by a technician, such as during a troubleshooting operation to measure the pressure in the control valve assembly 230. In some embodiments, a technician may use the measuring point coupling 249 when calibrating the control valve assembly 230.

The first valve 241 controls the direction of hydraulic fluid flow between the first coupling 233 and the second coupling 234. The first valve 241 may be actuated to allow fluid communication between the hydraulic input 231 and the first coupling 233 while simultaneously allowing fluid communication between the hydraulic output 232 and the second coupling 234. The first valve 241 may also be actuated to allow fluid communication between the hydraulic input 231 and the second coupling 234 while simultaneously allowing fluid communication between the hydraulic output 232 and the first coupling 233. The first valve 241 may be actuated in response to a signal, such as a signal from the control device 230. Alternatively, the first valve 241 may be manually actuated by depressing or lifting a first manual actuation member 241m connected to the first valve 241. The first manual actuation member 241m may be connected to a first hydraulic handle (not shown).

The second valve 242 controls the direction of hydraulic fluid flow between the third coupling 235 and the fourth coupling 236. The second valve 242 may be actuated to allow fluid communication between the hydraulic input 231 and the third coupling 235 while simultaneously allowing fluid communication between the hydraulic output 232 and the fourth coupling 236. The second valve 242 may also be actuated to allow fluid communication between the hydraulic input 231 and the fourth coupling 236 while simultaneously allowing fluid communication between the hydraulic output 232 and the third coupling 235. The second valve 242 may be actuated in response to a signal, such as a signal from the control device 230. Alternatively, the second valve 242 may be manually actuated by depressing or lifting a second manual actuation member 242m connected to second valve 242. The second manual actuation member 242m may be connected to a second hydraulic handle (not shown).

The third valve 243 controls the direction of hydraulic fluid flow between the fifth coupling 237 and the sixth coupling 238. The third valve 243 may be actuated to allow fluid communication between the hydraulic input 231 and the fifth coupling 237 while simultaneously allowing fluid communication between the hydraulic output 232 and the sixth coupling 238. The third valve 243 may also be actuated to allow fluid communication between the hydraulic input 231 and the sixth coupling 238 while simultaneously allowing fluid communication between the hydraulic output 232 and the fifth coupling 237. The third valve 243 may be actuated in response to a signal, such as a signal from the control device 230. Alternatively, the third valve 243 may be manually actuated by depressing or lifting a third manual actuation member 243m connected to third valve 243. The third manual actuation member 243m may be connected to a third hydraulic handle (not shown).

FIG. 2F illustrates an exemplary embodiment of the compensation valve block 250. The compensation valve block 250 includes a supply inlet 250a, a drain port 250d, a first control line inlet 253, a second control line inlet 254, a first control line outlet 255, a second control line outlet 256. The compensation valve block 250 may be activated to control the vertical actuator 500 for thread compensation during a makeup or break-out operation. The first control line inlet 253 is in fluidly connected with the first control line outlet 255. In some embodiments, the compensation valve block 250 may include a valve to selectively control fluid communication between the first control line inlet 253 and the first control line outlet 255. The second control line inlet 254 is in fluidly connected to the second control line outlet 256. In some embodiments, the compensation valve block 250 may include a valve to selectively control fluid communication between the second control line inlet 254 and the second control line outlet 256. When the compensation valve block 250 is not activated for thread compensation, the control valve assembly 230 and the compensation valve block 250 cooperate to allow for the extension or the retraction of the vertical actuator 500 to position the piston 501. The compensation valve block 250 may further include a counterbalance valve, such as an internal counterbalance valve, configured to maintain the piston 501 in a position such that the tong assembly 400 is maintained in a positon along the z-axis. For example, the counterbalance valve may maintain the piston 501 in a fully retracted position. The counterbalance valve may also be used to maintain the piston 501 in a position during a make-up or break-out operation.

The first coupling 233 is in fluid communication with the first control line inlet 253 via the first control line 273. The first control line inlet 253 is in fluidly connected with the first control line outlet 255. A hydraulic line 257 is connected to the first control line outlet 255. The hydraulic line 257 is connected to a hydraulic line 364 at one end, and the other end of the hydraulic line 364 is connected to the second port 504. Therefore, the second port 504 is in fluidly coupled to the first coupling 233.

The second coupling 234 is in fluid communication with the second control line inlet 254 via the second control line 274. The second control line inlet 254 is fluidly connected with the second control line outlet 256. A hydraulic line 258 is connected to the control line outlet 256. The hydraulic line 258 is connected to a hydraulic line 362 at one end, and the other end of the hydraulic line 362 is connected to the first port 502. Therefore, the first port 502 is fluidly coupled to the second coupling 234.

The third coupling 235 is in fluid communication with a first side of a hydraulic arm actuator 331 via the third control line 275. The fourth coupling 236 is in fluid communication with a second side of the hydraulic arm actuator 331 via the fourth control line 276. The fifth coupling 237 is in fluid communication with a first side of the hydraulic rotational actuator 330 via the fifth coupling 277. The sixth coupling 238 is in fluid communication with a second side of the hydraulic rotational actuator 330 via the sixth control line 278.

In some embodiments, the hydraulic input 231 and hydraulic output 232 may each include a valve. In some embodiments, the control valve assembly 230 includes one valve for each fluid coupling 233-238 instead of valves 241-243 that are actuatable to allow fluid communication between the hydraulic input 231 or the hydraulic output 232 and a corresponding fluid coupling 233-238.

FIG. 2C illustrates the control attachment 200 without control lines 275-278 and without line 280. FIG. 2D illustrates the control attachment 200 without lines 273-278 to better illustrates the connection hydraulic input 231 with line 280 and the connection of the hydraulic output 231 with attachment return line 221.

The attachment hydraulic supply line 220 has a first end 220a and a second end 220b. The first end 220a is connectable to a reservoir-side hydraulic fluid supply line 340 (as shown in FIG. 1). The second end 220b is coupled to the inlet 208a of the shutoff valve 208. The outlet 208b of the shutoff valve 208 is connected to the inlet 204a of the filter 204 via the line 226. The line 226 may also be connectable to a tong-side hydraulic supply line 350 (as shown in FIG. 1). The outlet 204b of the filter 204 is connected to the line 280. The line 280 is connected to both the hydraulic input 231 and the supply inlet 250a of the compensation valve block 250.

When the control attachment 200 is attached to the positioning device 300, hydraulic fluid may be supplied to the control attachment 200 and the tong assembly 400 by the reservoir-side hydraulic fluid supply line 340. The reservoir-side hydraulic fluid supply 340 is fluidly coupled to a hydraulic reservoir 335, and the supply hydraulic fluid may be pumped by a hydraulic pump fluidly coupled to the hydraulic reservoir. Hydraulic fluid supplied to the control attachment 200 passes through the shutoff valve 208 prior to flowing to the control valve assembly 230, the compensation valve block 250, and the tong assembly 400. The supply fluid enters the shutoff valve inlet 208a and exits the shutoff valve 208 at the outlet 208b and enters the line 226. The supply fluid in the line 226 may flow to the hydraulic input 231 and supply inlet 250a through the filter 204. The supply fluid in the line 226 may further flow to the tong assembly 400 via the tong-side hydraulic supply line 350. The tong assembly 400 may have a filter (not shown) to filter the hydraulic fluid supplied from the tong-side hydraulic supply 350. In some embodiments, the supply fluid may flow through the filter 204 before entering the tong-side hydraulic supply line 350.

The attachment return line 221 has a first end 221a connectable to a reservoir-side return line 341 (as shown in FIG. 1) and a second end 221b connectable to a tong-side return line 351 (as shown in FIG. 1). The reservoir-side return line 341 is connected to the hydraulic fluid reservoir 335. The attachment return line 221 is also connectable to the hydraulic output 232. Thus, hydraulic fluid may return from the control valve assembly 230 and the compensation valve block 250 to the hydraulic fluid reservoir 335 through the attachment return line 221 and the reservoir-side return line 341. Hydraulic fluid supplied to the tong assembly 400 via the tong-side hydraulic supply line 350 may return to the hydraulic reservoir 335 through the tong-side hydraulic return line 351, the attachment return line 221, and the reservoir-side return line 341.

The attachment drain line 222 has a first end 222a and a second end 222b. The attachment drain line 222 may be connected to the hydraulic drain 239, and the drain port 250d. The first end 222a is connectable to a reservoir-side drain line 342. The reservoir-side drain line 342 is connected to the hydraulic reservoir 335. The second end 222b may be connected to a tong-side drain line 352, which is connected to the tong assembly 400. A drain connection line 222c in fluid communication with the attachment drain line 222 is connectable to the positioning device 300, such as a drain line of the hydraulic arm actuator 331 and a drain line of the hydraulic rotational actuator 330.

The attachment electrical supply line 223 has a first end 223a connectable to an electrical supply line 343 (as shown in FIG. 1) and a second end 223b connectable to a tong-side electrical supply 353 connected to the tong assembly 400. The electrical supply 343 is connected to a power source, such as a generator. The attachment electrical supply line 223 may supply power to the pressure sensor 206, the shutoff valve 208, the control device 210, the compensation valve block 250, and the control valve assembly 230.

For example, wires may connect the attachment power supply line 223 to the pressure sensor 206, the shutoff valve 208, the control device 210, the control valve assembly 230, and the compensation valve block 250. In some embodiments, the attachment power supply line 223 is connected to a connector 212. A wire may then be connected to a different connector 212 that is connected to another control attachment 200 component, such as the compensation valve block 250, and the electrical power is then transmitted from the control device 210 to another control attachment 200 component. The wire may be part of the communication cable connecting a control attachment 200 component to the connector 212 of the control device 210. Thus, electrical power to the pressure sensor 206, the shutoff valve 208, the control valve assembly 230, and the compensation valve block 250 may be routed through the control device 210. Electrical power is supplied to the tong assembly 400 via the electrical supply lines 223, 343, and 353. In some embodiments, the positioning device 300 may receive electrical power from the power source via the attachment power supply line 223.

The attachment Ethernet line 224 has a first end 224a connectable to an Ethernet line 344 (as shown in FIG. 1) and a second end connectable to a tong-side Ethernet line 354 (as shown in FIG. 1) connected to the tong assembly 400. The control device 210 may be in communication with the Ethernet Line 224. For example, a section of the Ethernet line 224 may span from the first end 224a to a connector 212. A second section of the Ethernet line may span from the second end 224b to a different connector 212.

The control valve assembly 230 is in communication with the control device 210, such as through a communication cable. The control device 210 can send a signal to the control valve assembly 230 to actuate the first valve 241 to actuate the vertical actuator 500 to raise or lower the tong assembly 400 to a position. The control device 210 can send a signal to the control valve assembly 230 to actuate the second valve 242 actuate the hydraulic arm actuator 331 to extend or retract the arm 320. The control device 210 can send a signal to the control valve assembly 230 to actuate the third valve 243 to actuate the hydraulic rotational actuator 330 to rotate the arm 320 relative to the base 310 in a clockwise or a counter-clockwise direction. Therefore, the selective actuation of the valves 241-243 of the control device 210 may control the movement of the tong assembly 400 to a position about the x, y, z axes by controlling the hydraulic rotational actuator 330 and the hydraulic arm actuator 331 of the positioning device 300 and the vertical actuator 500.

When the compensation valve block 250 is not activated to compensate for a makeup or breakout operation of the tong assembly 400, the first valve 241 may control the vertical actuator 500 to raise or lower the tong assembly 400 to a position along the z-axis in preparation to perform a makeup or break-out operation.

To lower the tong assembly 400, the control device 210 instructs the first valve 241 to allow fluid communication between the hydraulic input 231 and the first coupling 233 and to allow fluid communication between the second coupling 234 and the hydraulic output 232. Hydraulic fluid supplied from the hydraulic input 231 flows to the second port 504 through the first coupling 233, the first control line 273, the open flow path between the first control line inlet 253 and the first control line outlet 255 of the compensation valve block 250, the line 257, and the line 364. The hydraulic fluid flows into the second port 504 and extends the piston 501, which lowers the tong assembly 400. As the tong assembly 400 is lowered, return fluid flows from the first port 502 of the vertical actuator 500 to the reservoir 335 via the line 362, line 258, the open flow path between the second control line outlet 256 and the second control line inlet 254 of the compensation valve block 250, the second control line 274, the flow path between the second coupling 234 and the hydraulic output 232, the attachment return line 221, and the reservoir-side return line 341. In some embodiments, the control device 210 also instructs the compensation valve block 250 open one or more valves to allow fluid communication between the first control line inlet 253 and the first control line outlet 255 and to allow fluid communication between the second control line inlet 254 and the second control line outlet 256.

To raise the tong assembly 400, the control device instructs the control valve assembly 230 to actuate the first valve 241 to allow fluid communication between the hydraulic input 231 and the second coupling 234 and to allow fluid communication between the first coupling 233 and the hydraulic output 232. Hydraulic fluid supplied from the hydraulic input 231 flows to the first port 502 through the second coupling 234, the second control line 274, the open flow path between the second control line inlet 254 and the second control line outlet 256 of the compensation valve block 250, the line 258, and the line 362. The hydraulic fluid flows into the first port 502 and retracts the piston 501, which raises the tong assembly 400. As the tong assembly 400 is raised, return fluid flows from the second port 504 to the reservoir 335 via the line 364, the line 257, the open flow path between the first control line outlet 255 and first control line inlet 253 of the compensation valve block 250, the first control line 273, the flow path between the first coupling 233 and the hydraulic output 232, the attachment return line 221, and the reservoir-side return line 341. In some embodiments, the control device 210 also instructs the compensation valve block 250 open one or more valves to allow fluid communication between the first control line inlet 253 and the first control line outlet 255 and to allow fluid communication between the second control line inlet 254 and the second control line outlet 256.

During a makeup or breakout operation of the tong assembly 400, the compensation valve block 250 is activated to provide thread compensation. Hydraulic fluid is selectively allowed to flow to one side of the piston 501 to extend or retract the vertical actuator 500 to compensate for the movement of the power tong 410 relative to the backup tong 420. The compensation valve block 250 may be activated in response to a pressure change in the vertical actuator 500.

As shown, the compensation valve block 250 further includes a first valve 251 and a second valve 252. The first valve 251 is a directional control valve, such as a three way solenoid spool valve. The second valve 252 may be a proportional control valve. During a make-up or a breakout operation, the first valve 251 is operated to compensate for the travel of the power tong 410 relative to the backup tong 420. For example, the first valve 251 may be operated to establish fluid flow between the supply inlet 250a to a pilot operated check valve (not shown) to open the pilot operated check valve. The second valve 252 may be in fluid communication with the pilot operated check valve when the pilot operated check valve is open. The second valve 252 may be configured to actuate at a set pressure, such as a target pressure, to allow fluid to be directed to the drain port 250d. The set pressure may be set at the weight of the tong assembly 400. The second valve 252 may selectively allow hydraulic fluid into or out of the in the lower chamber of the vertical actuator 500 (the lower chamber is in fluid communication with the first port 502) such that hydraulic fluid pressure in the lower chamber may be increased during a break-out operation and decreased in a make-up operation to adjust the position of the piston 501 to compensate for the travel of the power tong 410 to the backup tong 420. For example, during a make-up operation, the power tong 410 may move closer to the backup tong 420, which will exert a tension on the piston 501 and cause the pressure in the lower chamber to increase. Once the pressure increases above the set point of the second valve 252, the second valve 252 actuates to allow the fluid pressure in the lower chamber of the vertical actuator 500 to decrease until the set point is reached again. The second valve 252 may divert fluid flowing from the first port 502 into the attachment drain line 222 via the drain port 250d to allow the decrease in pressure in the lower chamber of the vertical actuator 500. Thus, the second valve 252 may be configured to allow the pressure in the lower chamber of the vertical actuator 500 to be equalized with the set pressure. The compensation valve block 250 may include additional valves and components. For example, additional components, such as needle valves and counterbalance valve may be present for compensation and/or for operations where the compensation valve block 250 is being used for an operation to extend or retract the vertical actuator 500. The pressure sensor 206 may be in communication with one or more of the measuring point couplings 259 to determine the pressure on either side of the piston 501 in the vertical actuator 500 since the compensation valve block 250 is in fluid communication with the first port 502 and the second port 504. In some embodiments, the second valve 252 may be selectively actuated based on a pressure measurement obtained by the pressure sensor 206. For example, the control device 210 may instruct the second valve 252 to actuate based on a pressure measurement obtained by the pressure sensor 206.

In some embodiments, the control device 210 device may activate the compensation valve block 250 by instructing the first valve 251 and/or the second valve 252 to actuate prior to and/or during a make-up or break-out operation. In some embodiments, the control device 210 activates the compensation valve block 250 by instructing the first valve 251 to actuate prior to a make-up or a break-out operation.

In some embodiments, the pressure sensor 206 monitors the pressure on both sides of the piston 501. In some embodiments, the pressure sensor 206 monitors pressure on only one side of the piston 501, such as the side of the piston 501 in communication with the first port 502. During a thread make-up or break-out operation, a pressure change in the vertical actuator 500 is detectable. The control device 210 may send the pressure measurements to the control system 110.

The control device 210 may monitor the pressure measurements obtained by the pressure sensor 206. In some embodiments, the control device 210 may be programed to automatically instruct the control valve assembly 230 and the compensation valve block 250 to extend or retract the vertical actuator 500 based on the pressure measurement. In some embodiments, the control device 210 sends the pressure measurements obtained by the pressure sensor 206 to the control system 110. The control system 110 may display these measurements to an operator such that the operator can monitor the pressure with the vertical actuator 500.

In some embodiments, pressure changes in the vertical actuator 500 are correlated to the vertical distance traveled by the power tong 410 relative to the backup tong 420. The compensation valve block 250 may be activated to supply hydraulic fluid to extend or retract the piston 501 based on the vertical distance traveled by the power tong 410 relative to the backup tong 420.

The second valve 242 is configured to control the hydraulic arm actuator 331 to cause the arm 320 to extend or contract. The third coupling 235 is in fluid communication with the hydraulic arm actuator 331 via the third control line 275 and the fourth coupling 236 is in fluid communication with the hydraulic arm actuator 331 via the fourth control line 276. To extend the arm 320, the control device 210 instructs the second valve 242 to establish fluid communication between the hydraulic input 231 and the third coupling 235 while establishing fluid communication between the hydraulic output 232 and the fourth coupling 236. Hydraulic supply fluid flows from the hydraulic input 231 to the hydraulic arm actuator 331, via the third coupling 235 and third control line 275, to extend the arm 320. As the arm 320 extends, return hydraulic fluid flows from the hydraulic arm actuator 331 to the hydraulic output 232 via the fourth coupling 236 and the fourth control line 276. To retract the arm 320, the control device 210 instructs the second valve 242 to establish fluid communication between hydraulic input 231 and the fourth coupling 236 while establishing fluid communication between the hydraulic output 232 and the third coupling 235. Hydraulic fluid flows from the hydraulic input 231 to the hydraulic arm actuator 331, via the fourth coupling 236 and fourth control line 276, to retract the arm 320. As the arm 320 retracts, return hydraulic fluid flows from the hydraulic arm actuator 331 to the hydraulic output 232 via the third coupling 235 and the third control line 275.

The third valve 243 is configured to control the hydraulic rotational actuator 330 to rotate the positioning device 300. Hydraulic fluid entering the hydraulic rotational actuator 330 rotates the gear 330g meshed with the gear 316g. The fifth coupling 237 is in fluid communication with the hydraulic rotational actuator 330 via the fifth control line 237 and the sixth coupling 238 is in fluid communication with the hydraulic rotational actuator 330 via the sixth control line 278. In some embodiments, to rotate the arm 320 clockwise relative to the stationary portion 314, the control device 210 instructs the third valve 243 to establish fluid communication between the hydraulic input 231 and the fifth coupling 237 while establishing communication between the hydraulic output 232 and the sixth coupling 238. Hydraulic supply fluid flows from the hydraulic input 231 to the hydraulic rotational actuator 330, via the fifth coupling 237 and fifth control line 277. In turn, the hydraulic rotational actuator 330 causes the rotatable portion 316, and thus the arm 320, to rotate clockwise relative to the stationary portion 314. Return fluid flows from the hydraulic rotational actuator 330 to the hydraulic output 232 via the sixth coupling 238 and the sixth control line 278. In some embodiments, to rotate the arm 320 counter-clockwise relative to the stationary portion 314, the control device 210 instructs the third valve 243 to establish fluid communicate between the hydraulic input 231 and the sixth coupling 238 while establishing communication between the hydraulic output 232 and the and the fifth coupling 237. Hydraulic supply fluid flows from the hydraulic input 231 to the hydraulic rotational actuator 330, via the sixth coupling 238 and sixth control line 278. In turn, the hydraulic rotational actuator 330 causes the rotatable portion 316, and thus the arm 320, to rotate counter-clockwise relative to the stationary portion 314. Return fluid flows from the hydraulic rotational actuator 330 to the hydraulic output 232 via the fifth coupling 237 and fifth control line 277.

In FIG. 1, the control attachment 200 of the tong positioning system 100 is shown attached to the illustrated positioning device 300 having actuators to control the position of the tong assembly 400 along the x,y axes while having a non-integrated actuator (vertical actuator 500) to control the position of the tong assembly 400 along the z-axis. In some embodiments, the vertical actuator 500 is an actuator integrated into the positioning device or integrated into an adapter connectable to a positioning device. For example, the control attachment 200 may be attached to Weatherford's PowerFrame III. Thus, the control attachment 200 may be attached to a positioning device having integrated actuators to control the position of the tong assembly 400 about the x, y, and z axes. In some embodiments, the positioning device 300 is not configured to rotate to move the tong assembly 400 about the x,y axis and instead has a hydraulic actuator actuatable by the third valve 243 to move the tong assembly 400 laterally.

In some embodiments, the control system 110 sends instruction signals to the control device 210 and the compensation valve block 250 to control the positioning device 300 to move the tong assembly 400 to a position about the x, y, z axes. For example, an operator instructs the control system 110, such as through a human machine interface (HMI), to move the tong assembly 400 to a position on the x, y axes, and the control system 110 sends a signal to the control device 210 to control the control valve assembly 230 to move the tong assembly 400 to the position on the x, y axes. In some embodiments, the control device 210 automatically instructs the control valve assembly 230 and compensation valve block 250 to move the tong assembly 400 to a position about the x, y, z axes. In some embodiments, the control system 110 may instruct the positioning device 300 and vertical actuator 500 to move the tong assembly about the x, y, and z axes at the same time. In some embodiments, the vertical actuator 500 is manually or automatically actuated after a makeup or breakout operation to reset the tong assembly 400 in a position along the z-axis for a subsequent makeup or breakout operation.

The shutoff valve 208 may be activated to prevent unintended operation of the control valve assembly 230 and/or compensation valve block 250. The shutoff valve 208 may be activated to stop the supply of hydraulic fluid to as a failsafe to shut down the tong assembly 400, such as stopping the flow of hydraulic fluid to the motor actuating the power tong 410.

In some embodiments, the control attachment 200 may be configured to omit control of the extension and retraction of a positioning device. Thus, the control valve assembly 230 may omit valves for of controlling the extension or retraction of the positioning device, such as the second valve 242. Alternatively, the third coupling 235 and fourth coupling 236 are capped and the control lines 275, 276 may be omitted. In some embodiments, the control attachment 200 may be configured to omit control of the rotation of the positioning device. Thus, the control attachment 200 may omit valves for controlling the rotation of the positioning device 300, such as the third valve 243. Alternatively, the fifth coupling 237 and the sixth coupling 238 are capped and the control lines 277, 278 may be omitted. In some embodiments, the control attachment 200 may be configured to omit control of the movement of the tong assembly 400 in both the x,y axes, such that the control attachment 200 is configured to only control movement along the z-axis and to provide thread compensation In some embodiments, and as shown in FIG. 1, the line reel 322 reels in or reels out the hydraulic lines 362, 364. In some embodiments, the one or more additional reel may reel in or reel out the tong-side supply line 350, the tong-side return line 351, the tong side drain line 352, the tong-side electrical supply 353, and the tong-side Ethernet line 354 as the arm 320 is retracted or extended. The tong-side supply line 350, the tong-side return line 351, the tong side drain line 352, the tong-side electrical supply 353, and the tong-side Ethernet line 354 may be suspended from the arm 320 as shown in FIG. 1.

Figure 3:
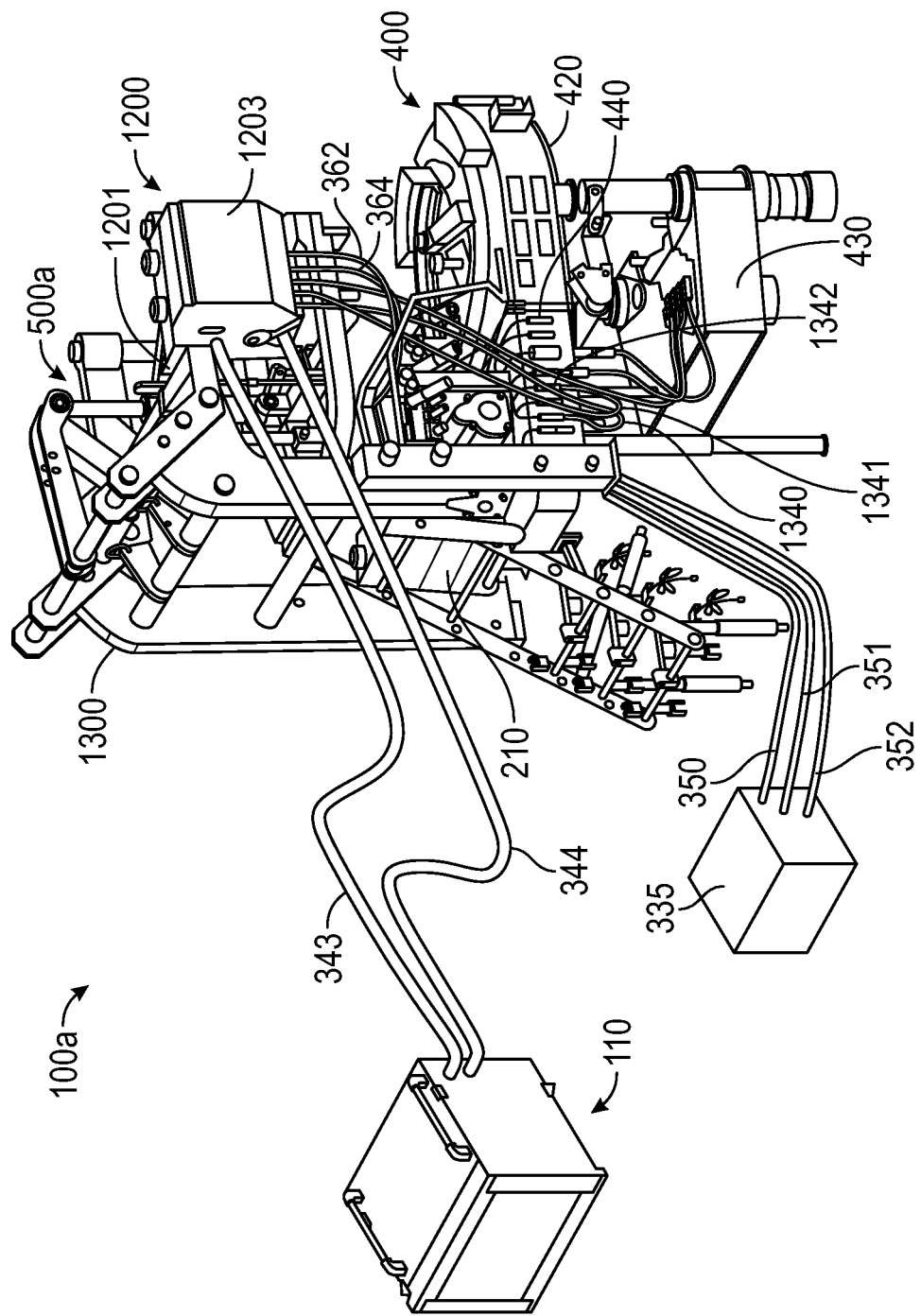
FIG. 3 illustrates an alternative tong positioning system with an alternative control attachment.

FIG. 3 illustrates an alternative embodiment of the tong positioning system 100a including a positioning device (not shown), a hydraulic reservoir, a control system 110, an adapter 1300, and a tong assembly 400. An operator may have an existing positioning device, but the positioning device may not be configured to support the operation of the tong assembly 400. The adapter 1300 configured to support the operation of the tong assembly 400 may be connected to the positioning device. The adapter 1300 supports the tong assembly 400. The positioning device may move the adapter 1300 and tong assembly 400 around the worksite in the x,y,z axes.

The adapter 1300 includes an integral vertical actuator 500a. The alternate vertical actuator 500a is a hydraulic actuator and functions in a manner similar to the vertical actuator 500 explained above. The vertical actuator 500a includes a piston (not shown), a first port (not shown), and a second port (not shown). The control attachment 1200 is shown attached to the adapter 1300. As shown, the control attachment 1200 includes a cover 1203. The control attachment 1200 may be attached to adapter 1300 by a bracket 1201. The tong assembly 400 is coupled to the adapter 1300. The adapter 1300 may have pivotable joints configured to accommodate the movement of the tong assembly 400, such as the raising or lowering of the tong assembly 400, including the movement of the power tong 410 relative to the backup tong 420 during a make-up or break-out operation. The control system 110 may control the control attachment 1200 and the positioning device.

FIG. 4A-4D illustrates the alternative control attachment 1200 for the adapter 1300 having an integral vertical actuator 500a that functions in a manner similar to the vertical actuator 500 explained above. The control attachment 1200 is similar to the control attachment 200, except that the control attachment 1200 does not control the actuation of the positioning device to move the tong assembly 400 about the x, y axes. Instead, the control attachment 1200 is configured to control the movement of the tong assembly 400 along the z-axis and to provide thread compensation and to position the tong assembly 400 for a make-up and break-out operation. The positioning device may be controlled to move the tong assembly 400 about the x,y, and z axes by a different control system, such as a control system built integrally into the positioning device.

Figure 4A:
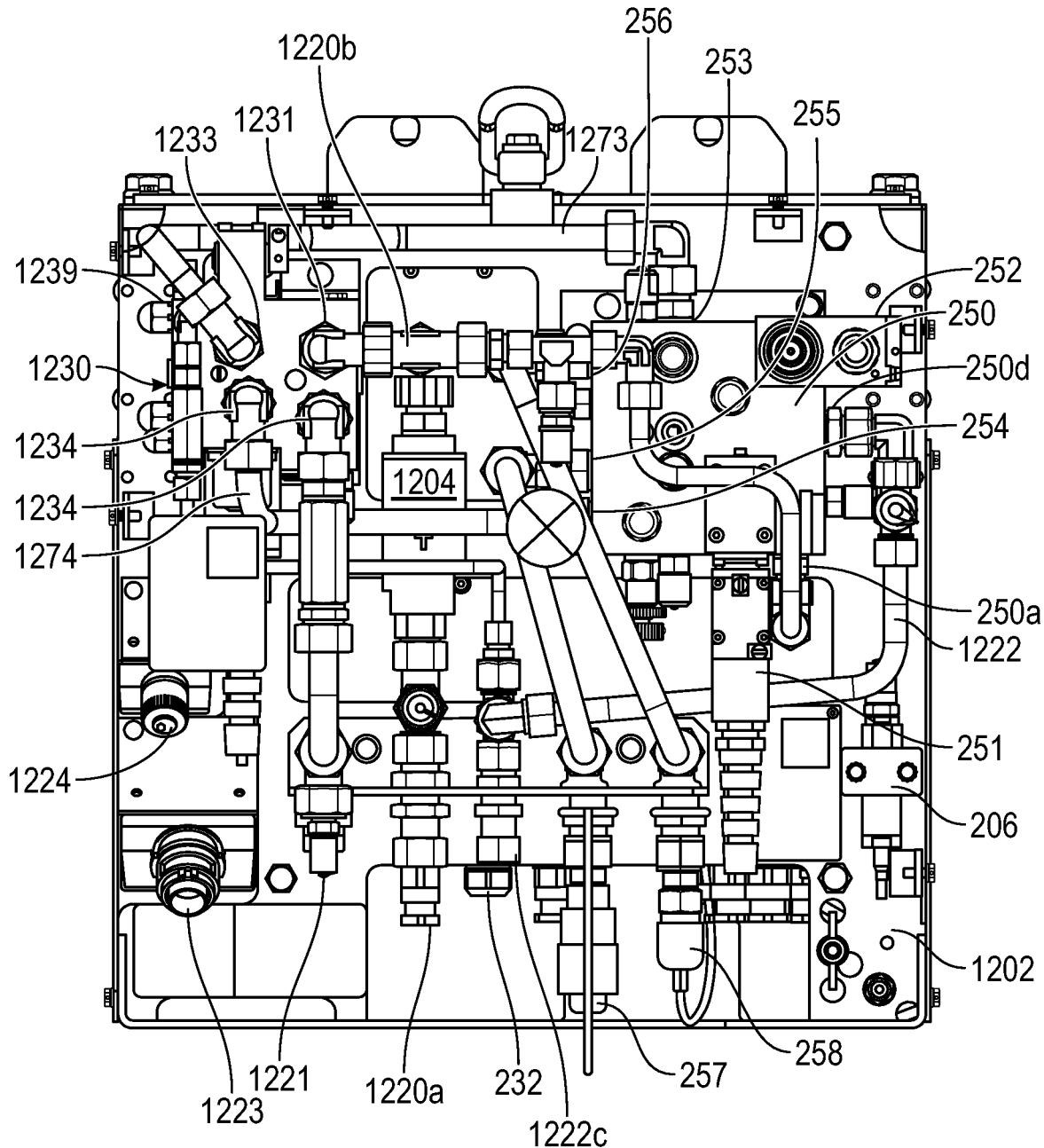
FIGS. 4A-4D illustrates an alternative embodiment of a control attachment.
Figure 4B:
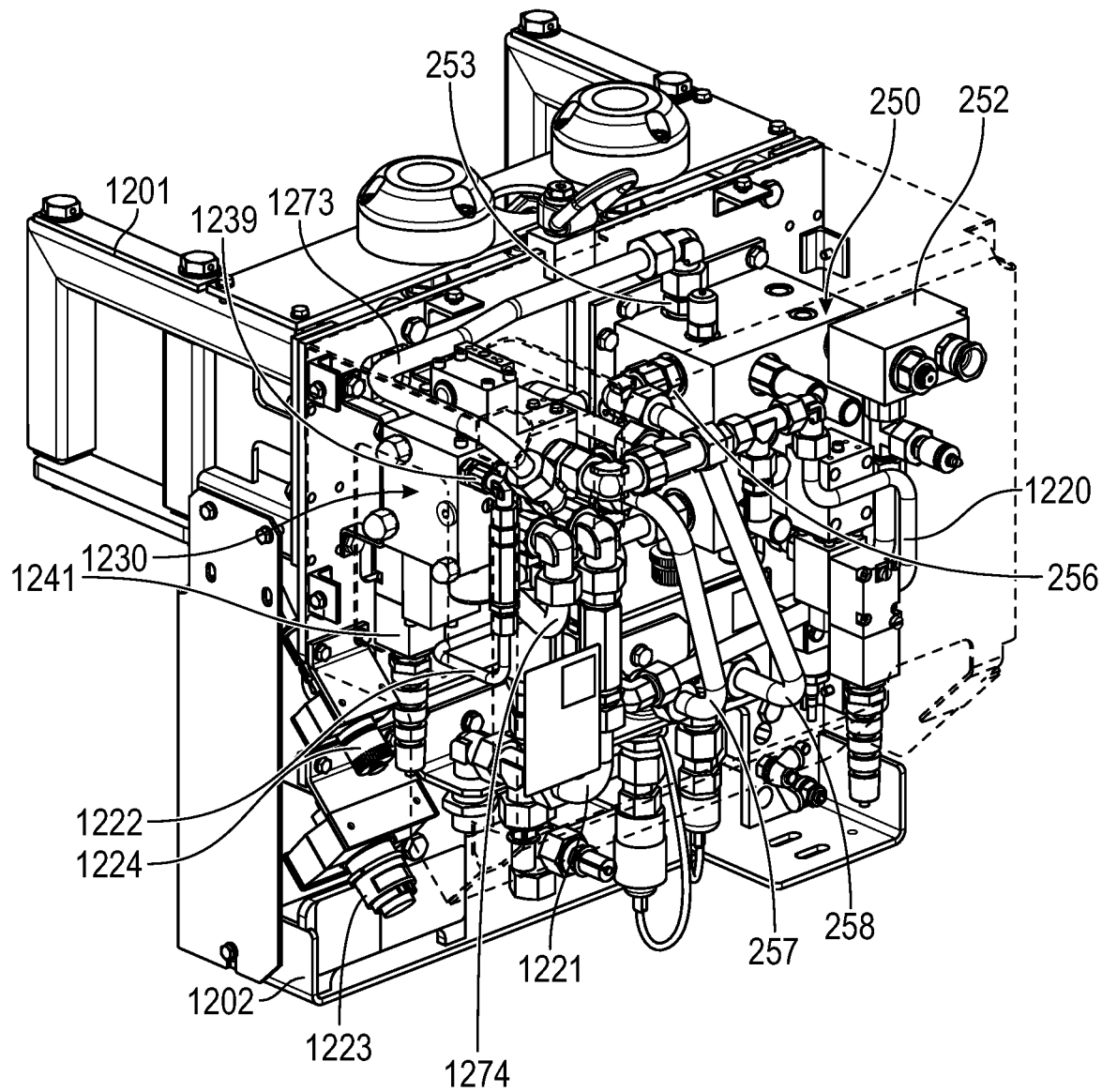
Figure 4C:
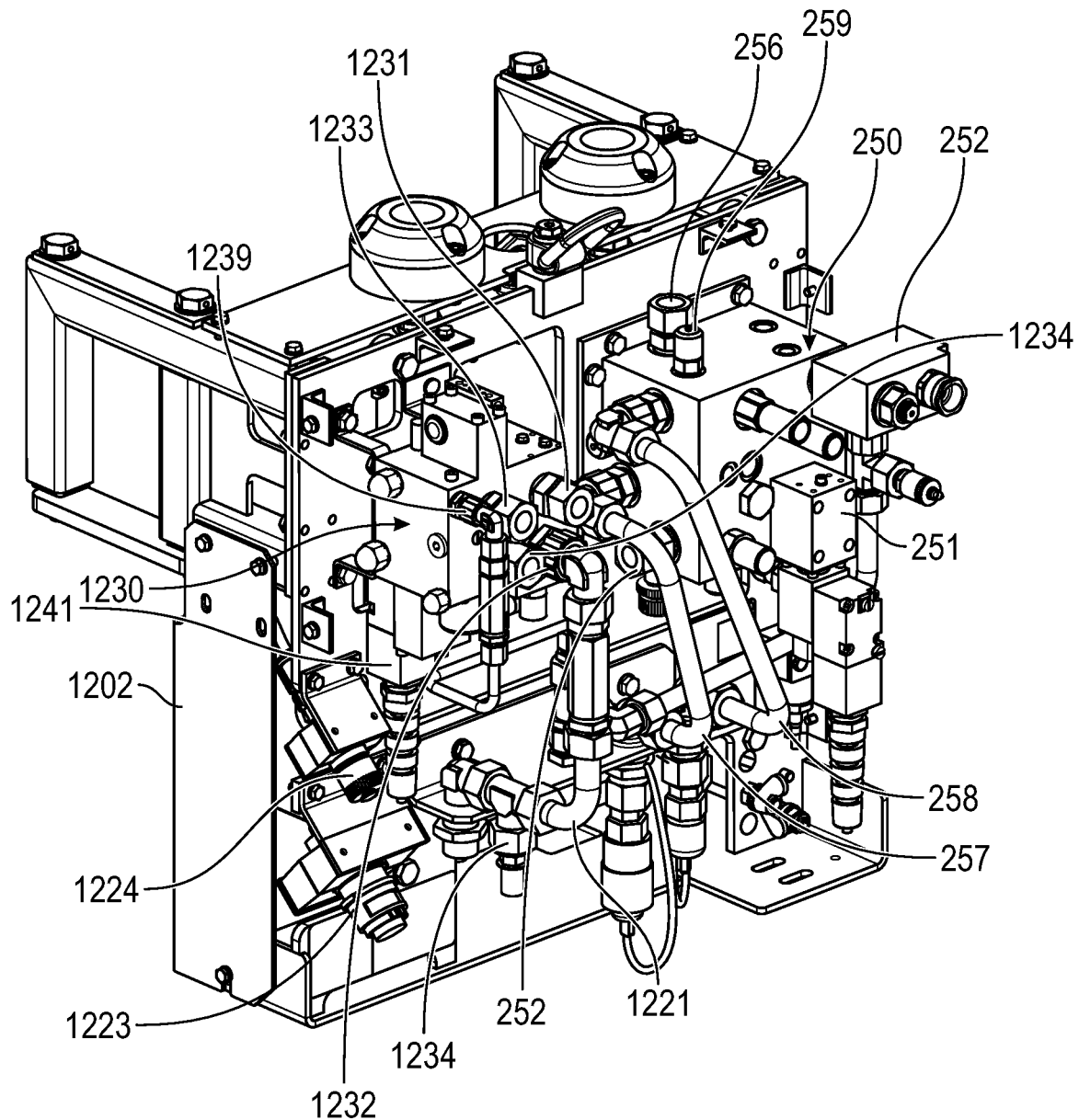
Figure 4D:
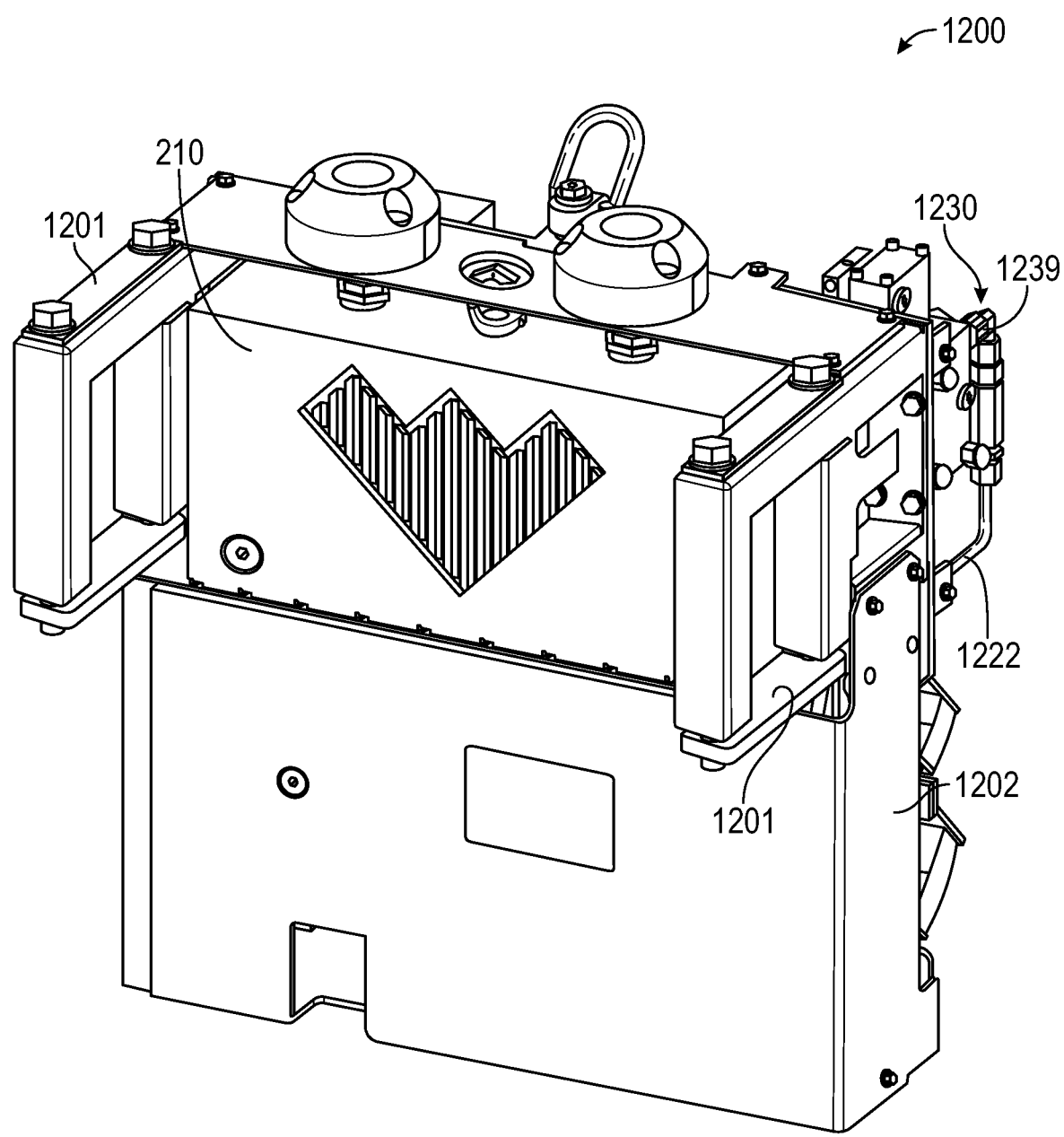

The control attachment 1200 includes a body 1202, a filter 1204, the pressure sensor (or pressure transducer) 206, a control valve assembly 1230, an attachment hydraulic supply line 1220, an attachment hydraulic return line 1221, an attachment hydraulic drain line 1222, an attachment electrical line 1223, an attachment Ethernet line 1224, a control device 210, a compensation valve block 250, control lines 1273-1274, and lines 257-258 As shown in FIG. 4D, the control device 210 may be attached to the opposite side of the body 1202 as the control valve assembly 1230 and compensation valve block 250. The control device 210 is in communication with the control system 110, the control valve assembly 1230, the compensation valve block 250, and the pressure sensor 206. The control device 210 may also be in communication with the tong assembly 400. The attachment electrical line 1223 may be connected to an electrical supply 343. The control attachment 1200 may receive electrical power via the attachment electrical line 1223. The control device 210 may be in communication with the attachment Ethernet line 1224. For example the Ethernet line 1224 may be connected to a connector 212. The attachment Ethernet line 1224 may be connected to an Ethernet supply line 344. The control device 210 may be connected to the Ethernet line 1224, such as by a connector 212.

FIG. 4B illustrates the control attachment 1200 from a different perspective. FIG. 4C illustrates the control attachment 1200 without control line 1273-74 and the supply line 1220 and filter 1204 to better show other components of the control attachment 1200. FIG. 4D illustrates the other side of the control attachment 1200 not shown in FIG. 4A-4C.

Figure 4E:
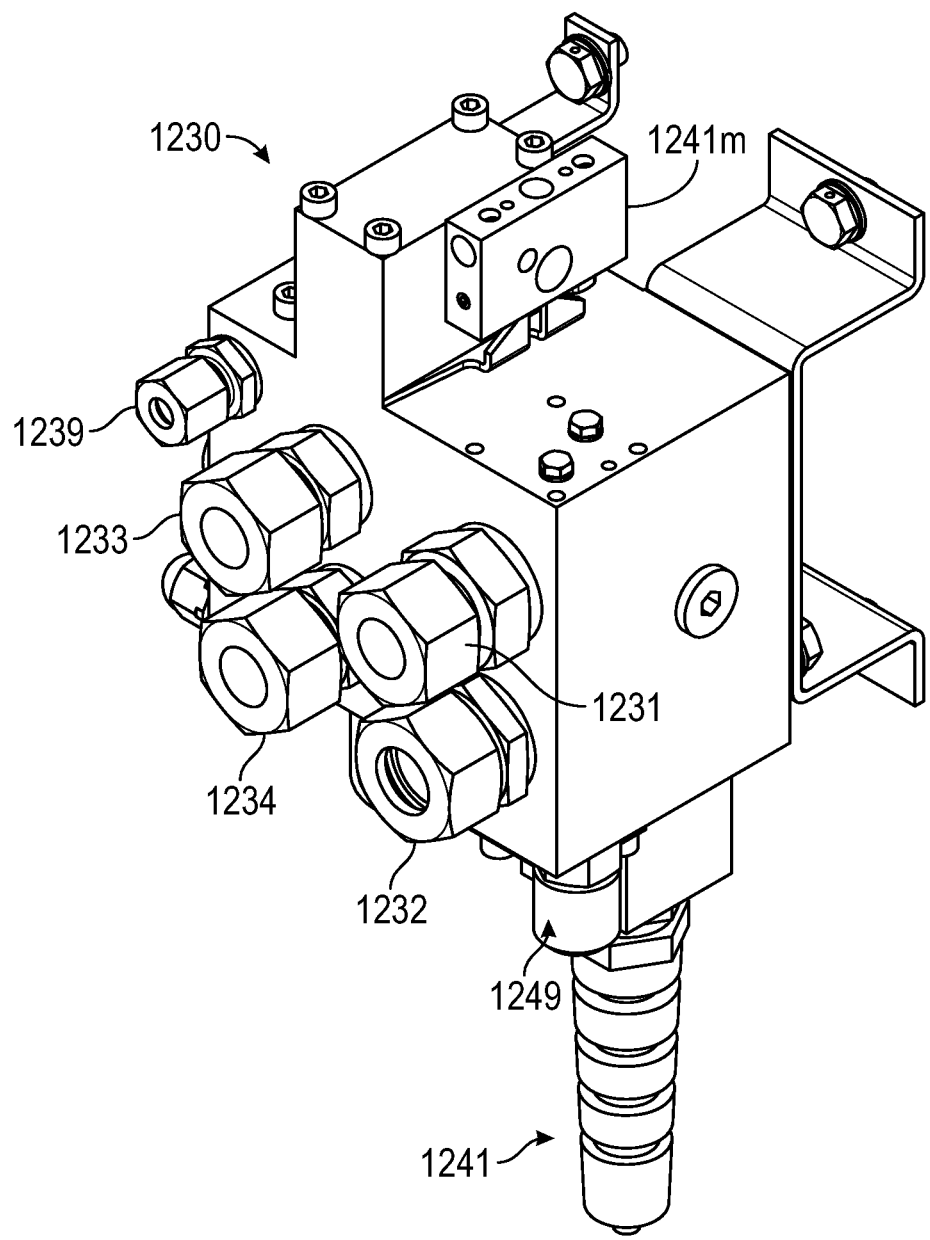
FIG. 4E illustrates a control valve block of the control attachment shown in FIG. 4A.

FIG. 4E illustrates the control valve assembly 1230. The control valve assembly 1230 may be a valve block manufactured by HAWE Hydraulik. The control valve assembly 1230 may include a hydraulic input 1231, a hydraulic output 1232, a first coupling 1233, a second coupling 1234, and a hydraulic drain 1239. The control valve assembly 1230 further includes a valve 1241. The valve 1241 may be a solenoid valve, such as a bidirectional solenoid valve. In some embodiments, the control valve assembly 1230 includes a measuring point coupling 1249, which can be optionally connected to a pressure sensor by a technician, such as during a troubleshooting operation to measure the pressure in the control valve assembly 1230. In some embodiments, the hydraulic input 1231 and hydraulic output 1232 may each include a valve.

In some embodiments, the pressure sensor 206 monitors the pressure on both sides of the piston of the actuator 500a via a fluid connection, such as through a fluid connection with the compensation valve block 250. In some embodiments, the pressure sensor 206 monitors pressure on only one side of the piston, such as the side of the piston in communication with the first port. During a thread make-up or break-out operation, a pressure change in the vertical actuator 500 is detectable.

As shown in FIG. 4A, the attachment hydraulic supply line 1220 includes a first segment 1220a and a second segment 1220b. The first segment 1220a of the hydraulic supply line 1220a is fluidly coupled to the inlet of the filter 1204. The outlet of the filter 1204 is fluidly coupled to the second segment 1220b of the hydraulic supply line 1220. The second segment 1220b of the hydraulic supply line 1220 is also fluidly coupled to the hydraulic input 1231 and to the hydraulic supply inlet 250a. The first segment 1220a may be connected with another hydraulic line, such as by hydraulic supply line 1340 connected to the tong assembly 400, to fluidly couple the first segment 1220a to the hydraulic reservoir 335. Thus, the attachment hydraulic supply line 1220 supplies hydraulic fluid to the control valve assembly 1230 and the compensation valve block 250. FIG. 4A illustrates a cap on the lines 257, 258, but those caps are removed when the lines 257, 258 are fluidly coupled to the line 362, 364.

The attachment hydraulic return line 1221 is fluidly coupled to the hydraulic output 1232. The attachment hydraulic return line 1221 may be connected with another hydraulic line, such as hydraulic return line 1341 connected to the hydraulic manifold 440 of the tong assembly 400, such that the attachment hydraulic return line 1221 is fluidly coupled to the hydraulic reservoir 335.

The attachment drain line 1222 is fluidly coupled to the hydraulic drain 1239 and the drain port 250d. The attachment hydraulic drain 1222 may be connected to another drain line, such as drain line 1342 connected to the hydraulic manifold 440 of tong assembly 400. Thus, the attachment drain line 1222 is fluid communication with the hydraulic reservoir 335.

The first coupling 1233 is fluidly coupled to the first control line inlet 253 of the compensation valve block 250 by the first control line 1273. The second coupling 1234 is fluidly coupled to the second control line inlet 254 of the compensation valve block 250 by the second control line 1274.

The first control line outlet 255 of the compensation valve block 250 is in fluid communication with the second port of the vertical actuator 500a. For example, the line 257 connected to the first control line outlet 255 may be connected to a line 364 which is connected to the second port. The second control line outlet 256 of the compensation valve block 250 is in fluid communication with the first port of the vertical actuator 500a. For example, the line 258 connected to the second control line outlet 256 may be connected to a line 362 which is connected to the first port.

When the compensation valve block 250 is not activated to compensate for a makeup or breakout operation of the tong assembly 400, the valve 1241 may control the vertical actuator 500a to raise or lower the tong assembly 400 along the z-axis in preparation to perform a makeup or break-out operation. For example, the vertical actuator 500a may move the power tong 410 relative to the backup tong 420. The control valve assembly 1230 is in communication with the control device 210. The connection may be a wired or wireless connection. The control device 210 may send a signal to the control valve assembly 1230 and to the compensation valve block 250 to actuate the vertical actuator 500a to raise or lower the tong assembly 400.

To lower the tong assembly 400 with the vertical actuator 500a using the control attachment 1200, the control device 210 instructs the control valve assembly 1230 to actuate the valve 1241 to establish fluid communication between the hydraulic input 1231 and the first coupling 1233 and to establish communication between the second coupling 1234 and the hydraulic output 1232. The control device 210 may also instruct the compensation valve block 250 to allow fluid communication between the first control line inlet 253 and the first control line outlet 255 and to allow fluid communication between the second control line inlet 254 and the second control line outlet 256. Hydraulic fluid supplied from the hydraulic input 1231 flows to the second port through the first coupling 1233, the first control line 1273, the open flow path between the first control line inlet 253 and the first control line outlet 255 of the compensation valve block 250, the line 257, and the line 364. The hydraulic fluid flow into the second port and extends piston, which lowers the tong assembly 400. As the tong assembly 400 is lowered, return fluid flows from the first port of the vertical actuator 500a to the attachment hydraulic return line 1221 through the line 362, line 258, the open flow path between the second control line outlet 256 and the second control line inlet 254 of the compensation valve block 250, the second control line 1274, the second coupling 1234, and the hydraulic output 1232.

To raise the tong assembly 400 with the vertical actuator 500a using the control attachment 1200, the control device 210 instructs the control valve assembly 1230 to actuate the valve 1241 to establish fluid communication between the hydraulic input 1231 and the second coupling 1234 and to establish communication between the first coupling 1233 and the hydraulic output 1232. The control device 210 may also instructs the compensation valve block 250 to allow fluid communication between the first control line inlet 253 and the first control line outlet 255 and to allow fluid communication between the second control line inlet 254 and the second control line outlet 256. Hydraulic fluid supplied from the hydraulic input 1231 flows to the first port through the second control line 1274, the open flow path between the second control line inlet 254 and the second control line outlet 256 of the compensation valve block 250, the line 258, and the line 362. The hydraulic fluid flows into the first port and retracts the piston, which raises the tong assembly 400. As the tong assembly 400 is raised, return fluid flows from the second port to the attachment hydraulic return line 1221 through the line 364, the line 257, the open flow path between the first control line outlet 255 and first control line inlet 253 of the compensation valve block 250, the first control line 1273, the first coupling 1233, and the hydraulic output 1232.

During a makeup or breakout operation of the tong assembly 400, the compensation valve block 250 is activated to provide thread compensation. Hydraulic fluid is selectively allowed to flow into and out of the vertical actuator 500a by the compensation valve block 250 to compensate for the travel of the power tong 410 relative to the power tong 420 during a make-up or a break-out operation. The compensation valve block 250 may be activated as discussed above regarding the control attachment 200 to extend or retract the vertical actuator 500a for thread compensation. For example, the compensation valve block 250 may be used to maintain a set pressure in the lower chamber of the vertical actuator 500*a* by allowing fluid flow into or out of the second port, which results in the movement of the piston. Thus, the compensation valve block 250 may be used to extend or retract the vertical actuator 500*a* to compensate for the travel of the power tong 410 relative to the backup tong 420 due to the travel of the threads.

In some embodiments, and as shown in FIG. 3, the control attachment 1200 is fluidly coupled with a hydraulic manifold 440 of tong assembly 400. The hydraulic manifold 440 is in communication with the hydraulic reservoir 335. The hydraulic reservoir 335 supplies hydraulic fluid to the hydraulic manifold 440. The hydraulic manifold 440 may be used to control the tong assembly 400 and may supply hydraulic fluid to the hydraulic motor of the power tong 410. As shown, the attachment supply line 1220 receives supply fluid from a supply line 1340 connected to the manifold 440. The attachment return line 1221 and the attachment drain line 1222 are fluidly coupled to the manifold 440. Thus, the control attachment 1200 is shown as receiving the supply fluid from the tong assembly 400 and the drain and return fluid is routed through the tong assembly 400. Therefore, the supply fluid used to operate the tong assembly 400 is used to supply the control attachment 1200.

In some embodiments, the control attachment 1200 and the tong assembly 400 are connected to different hydraulic reservoirs. In some embodiments, a tong-side supply line, such as tong-side supply line 350, may be fluidly coupled to the supply line 1220 such that hydraulic supply fluid to the tong assembly 400 passes through the control attachment 1200. In some embodiment, a tong-side return line, such as tong-side return line 351, may be fluidly coupled to the attachment return line 1221 such that return fluid from the tong assembly 400 passes through the control attachment 1200. In some embodiments, the tong assembly 400 has a return line independent of the control attachment 1200. In some embodiment, a tong-side drain line, such as tong-side drain line 352, may be fluidly coupled to the attachment drain line 1222 such that drain fluid from the tong assembly 400 passes through the control attachment 1200. In some embodiments, the tong assembly 400 has a drain line independent of the control attachment 1200. In some embodiments, the positioning device and the control attachment are connected to different hydraulic reservoirs.

In some embodiments, the control attachment 1200 is used with a vertical actuator 500*a* that is not integrated into a positioning device, such as vertical actuator 500 shown in FIG. 1.

In some embodiments, the control attachments 200, 1200 are retrofitted onto an existing positioning device. For example, the control attachment 1200 may be retrofitted onto a positioning device to replace (or in the place of) the control system used to control the positioning device to move a tong assembly along the z-axis while a different control system controls the positioning device to move the tong assembly to position about the x, y axes. In some embodiments, the control attachment 200, 1200 is attached to or retrofitted onto an existing positioning device to supplement the control system of the existing positioning device.

In some embodiments, the control system 110 is communication with the tong assembly 400. In some embodiments, the control system 110 controls the tong assembly 400. For example, the control system 110 sends instructions to the tong assembly 400 via the Ethernet lines. In some embodiments, the control system 110 instructs the control device 210 to send instructions to the tong assembly 400. For example, the control system 110 instructs the control device 210 to instruct the power tong 410 to grip and rotate a tubular. In some embodiments, the control system 110 is in communication with an HMI. An operator may interact with the HMI to control the tong positioning system 100, 100*a*. For example, the HMI may be a web interface or an HMI component of a supervisory control and data acquisition (SCADA) system. The HMI may have a graphical display that can be displayed on a smartphone, tablet, a personal digital assistant (PDA), monitor, or any other visual display device as desired and may include one or more network interfaces that may be used to connect to and communicate with the control system 110 and/or the control device 210. In some embodiments, the control system 110 is interfaced with a universal remote control configured to receive inputs or commands from an operator that can be used to control the tong positioning system 100, 100*a*. The tong assembly 400 may be in communication with torque/turns analyzing software, such as TorkPro 3™. The power tong 410 and/or the backup tong 420 may have sensors to measure and document tubular make-up or tubular-break out information, and this information may be transmitted from the tong assembly 400 to the control device 210 of the control attachment 200, 1200. In some embodiments, the control system 110 controls the hydraulic pump supplying fluid to the control attachments 200, 1200. Therefore, the control system 110 may control the pressure of the supply fluid.

In some embodiments, the tong assembly 400 also includes a control device 210. The control device 210 of the tong assembly 400 may be used to control the tong assembly 400, such as to control the makeup and breakout operations. The control device 210 of the tong assembly 400 may also receive tubular break-out or make-up information obtained from sensors, and this information may be transmitted from the control device 210 of the tong assembly 400 to the control device 210 of the control attachment 200, 1200. The control device 210 of the control attachment 200, 1200 may communicate with and/or send instructions to the control device 210 of the tong assembly 400. Thus, the control system 110 is in communication with the control device 210 of the tong assembly 400 and the respective control device 210 integrated with the control attachment 200, 1200. In some embodiments, the control system 110 and/or the control device 210 may instruct the hydraulic manifold 440 to control the tong assembly 400, such as instructing the hydraulic manifold 440 to allow fluid to be directed the hydraulic motor of the power tong 410 to begin a make-up or a break-out operation.

In some embodiments, the attachment electric supply 223, 1223 is connected to positioning device and/or the tong assembly 400 to supply electrical power. In some embodiments, the Ethernet line 224, 1224 is connected to the positioning device and/or the tong assembly 400 to connect the positioning device and/or tong assembly 400 to a network and/or internet. The Ethernet lines may connect the control devices 210 to a network and/or the internet.

In some embodiments, the pump supplying hydraulic fluid may be selectively controlled to control the speed of actuation of the positioning device and/or vertical actuators 500, 500*a*. In some embodiments, the control valve assembly 230, 1230 and/or the compensation valve block 250 may be throttled to control the flow rate of the hydraulic fluid. For example, the compensation valve block 250 may be throttled to control the amount and/or speed of the extension/retraction of the vertical actuator 500, 500*a*. In some embodiment, the hydraulic pump supplying hydraulic fluid may adjust the flow rate to control the speed of the extension/retraction of the vertical actuator 500, 500*a*.

While an exemplary positioning devices 300 is illustrated, it is foreseeable that the control attachments 200 can be attached to positioning devices of other designs. While an exemplary adapter 1300 is illustrated, it is foreseeable that the control attachment 1200 can be attached to an adapter of other designs.

In one embodiment, a tong positioning system includes a positioning device configured to move a tong assembly. The positioning device includes a first actuator, a second actuator, and a control attachment attachable to the positioning device. The control attachment includes a shutoff valve fluidly coupled to a hydraulic supply, a control valve block, and a control device. The control valve block includes a hydraulic input fluidly coupled to the shutoff valve, a hydraulic output fluidly coupled to a hydraulic return, a first valve fluidly coupled to the first actuator, the first valve configured to actuate the first actuator, and a second valve fluidly coupled to the second actuator, the second valve configured to actuate the second actuator. The control device is configured to control the first valve and to control the second valve to actuate the first and second actuators to move the tong assembly.

In some embodiments, the tong positioning system includes a control system in communication with the control device and configured to control the control device.

In some embodiments of the tong positioning system, the control device is configured to control the shutoff valve to close fluid communication between the hydraulic supply and the hydraulic input.

In some embodiments, the tong positioning system further includes a third actuator configured to raise or lower the tong assembly. The control attachment further includes a compensation valve block fluidly coupled to the third actuator, the compensation valve block including one or more valves. The control valve block includes a third valve fluidly coupled to the compensation valve block.

In some embodiments of the tong positioning system, the control device is configured to control the third valve and the compensation valve block to actuate the third actuator.

In some embodiments of the tong positioning system, the control device is configured to activate the compensation valve block for a thread compensation operation. The thread compensation operation includes allowing a hydraulic fluid to flow from the compensation valve block to the third actuator to retract the third actuator in response to the travel of a power tong relative to a back-up tong of the tong assembly during a tubular break-out operation of the tong assembly.

In some embodiments of the tong positioning system, the control attachment further includes at least one of a pressure sensor or a pressure transducer configured to measure a pressure in the third actuator. The compensation valve block is configured to actuate the third actuator to compensate for a thread makeup or a thread breakout operation of the tong assembly based on the pressure measurements.

In some embodiments of the tong positioning system, the positioning device includes the third actuator.

In some embodiments, the tong positioning system further includes a tong-side hydraulic supply line and a tong-side hydraulic return line.

The tong-side hydraulic supply line is fluidly coupled to the shutoff valve, wherein the tong-side hydraulic supply line is configured to fluidly couple the tong assembly to the hydraulic supply. The tong-side hydraulic return line is fluidly coupled to a hydraulic return line of the control attachment, wherein the hydraulic return line of the control attachment is further fluidly could to the hydraulic output.

In some embodiments of the tong positioning system, the control device is configured to control the tong assembly.

In some embodiments of the tong positioning system, the control attachment further includes an electrical line configured to supply electricity to the tong assembly, and an Ethernet line configured to connect the tong assembly to a network.

In one embodiment, a tong positioning system includes a tong assembly, an adapter, a positioning device, and a control attachment. The adapter is configured to support the tong assembly, the adapter including a first actuator actuatable to raise or lower the tong assembly. The positioning device is configured to move the adapter and the tong assembly, the positioning device including a second actuator. The control attachment is attachable to the adapter. The control attachment including a control valve assembly, a compensation valve block, and a control device. The control valve assembly is fluidly coupled to a hydraulic supply. The control valve assembly including a hydraulic input, a first valve, and a hydraulic output. The compensation valve block fluidly is coupled to the control valve assembly and fluidly coupled to the first actuator. The control device is configured to actuate the first valve and the compensation valve block to actuate the first actuator, the control device further configured to activate the compensation valve block to actuate the compensation valve block to compensate for a thread makeup and/or a thread breakout operation with the tong assembly.

In some embodiments, the tong positioning system includes a hydraulic control system configured to actuate the second actuator.

In some embodiments, the tong positioning system includes a tong-side hydraulic supply line fluidly coupled a hydraulic supply line of the control attachment, wherein the tong-side hydraulic supply line is configured to fluidly couple the tong assembly to the hydraulic supply line. The tong positioning system further includes a tong-side hydraulic return line fluidly coupled to a hydraulic return line of the control attachment, wherein the hydraulic return line of the control attachment is further fluidly coupled to the hydraulic output.

In some embodiments of the tong positioning system, the control valve assembly further includes a second valve configured to control the second actuator, and wherein the control device is configured to actuate the second valve to actuate the second actuator.

In some embodiments of the tong positioning system, the control device is configured to control the tong assembly.

In some embodiments of the tong positioning system, wherein the positioning device includes a third actuator and the control valve assembly includes a third valve fluidly coupled to the third actuator and configured to actuate the third actuator.

In one embodiment of a method of operating a tong apparatus at a worksite, the method including installing a control attachment to a positioning device, the control attachment including a control valve assembly and a compensation valve block. The method further including actuating the control valve assembly to hydraulically actuate a first actuator of the positioning device to move the tong apparatus coupled to the positioning device to a position about an x, y axes at the worksite. The method further including actuating the control valve assembly and the compensation valve block to hydraulically actuate a second actuator to raise or lower the tong apparatus about a z-axis at the worksite. The method further including activating the compensation valve block to actuate the second actuator to compensate for a thread makeup or thread breakout operation of the tong apparatus.

In some embodiments, the method of operating the tong assembly includes suppling hydraulic fluid to the tong apparatus by flowing hydraulic supply fluid to a hydraulic supply line of the control attachment that is fluidly coupled to a tong-side hydraulic supply line.

In some embodiments, the method of operating the tong assembly includes sending an instruction signal to actuate the compensation valve block and the control valve assembly from a control device of the control attachment.

In some embodiments of the method of operating the tong assembly, the installing of the control attachment comprises retrofitting the control attachment onto the positioning device.

In some embodiments, the method of operating a tong assembly includes removing at least a portion of a preexisting control system attached to the positioning device prior to attaching the control attachment.

While the foregoing is directed to embodiments of the present disclosure, other and further embodiments of the disclosure may be devised without departing from the basic scope thereof, and the scope thereof is determined by the claims that follow.

What is claimed is:

1. A tong positioning system, comprising:
   a tong assembly comprising a power tong and a backup tong;
   a first actuator configured to raise or lower the tong assembly;
   a positioning device configured to move the tong assembly laterally, the positioning device including a second actuator;
   a preexisting control system; and
   a retrofit control attachment in communication with the preexisting control system and operatively connected to the first and second actuators, the retrofit control attachment including:
     a control valve assembly configured to actuate the first and second actuators;
     a compensation valve block fluidly coupled to the control valve assembly and fluidly coupled to the first actuator; and
     a control device configured to operate the control valve assembly, wherein the control device is further configured to actuate the compensation valve block to provide thread compensation during a thread makeup and/or a thread breakout operation of the tong assembly,
   whereby the retrofit control attachment provides improved control over vertical and lateral positioning of the tong assembly compared to the preexisting control system.

2. The tong positioning system of claim 1, wherein the control valve assembly includes a first valve configured to actuate the first actuator.

3. The tong positioning system of claim 2, wherein the control valve assembly further includes a second valve configured to actuate the second actuator.

4. The tong positioning system of claim 3, wherein:
   the positioning device includes a third actuator; and wherein:
   the control valve assembly further includes a third valve configured to actuate the third actuator.

5. The tong positioning system of claim 1, further comprising:
   a tong-side hydraulic supply line fluidly coupled to a hydraulic supply line of the retrofit control attachment; and
   a tong-side hydraulic return line fluidly coupled to a hydraulic return line of the retrofit control attachment.

6. The tong positioning system of claim 1, wherein one end of the first actuator is coupled to a crane system of a derrick.

7. A method of operating a tong assembly at a worksite, comprising:
   coupling the tong assembly to a positioning device, the tong assembly comprising a power tong and a backup tong;
   integrating a retrofit control attachment with a preexisting control system of the positioning device, the retrofit control attachment including a control valve assembly, a compensation valve block, and a control device, whereby the retrofit control attachment provides improved control over vertical and lateral positioning of the tong assembly compared to the preexisting control system;
   actuating the control valve assembly to hydraulically actuate a first actuator of the positioning device to move the tong assembly laterally at the worksite;
   actuating the control valve assembly to hydraulically actuate a second actuator to raise or lower the tong assembly at the worksite; and
   actuating the compensation valve block to provide thread compensation during a thread makeup and/or thread breakout operation of the tong assembly.

8. The method of claim 7, further comprising:
   supplying hydraulic fluid to the tong assembly by flowing hydraulic supply fluid to a hydraulic supply line of the retrofit control attachment.

9. The method of claim 7, further comprising:
   sending an instruction signal to actuate at least one of the compensation valve block and the control valve assembly from the control device of the retrofit control attachment.

10. The method of claim 7, prior to operatively connecting the retrofit control attachment, removing at least a portion of the preexisting control system of the positioning device.

11. The method of claim 7, wherein one end of the second actuator is coupled to a crane system of a derrick.

* * * * *